(12) United States Patent
Chen et al.

(10) Patent No.: US 11,537,895 B2
(45) Date of Patent: Dec. 27, 2022

(54) GRADIENT NORMALIZATION SYSTEMS AND METHODS FOR ADAPTIVE LOSS BALANCING IN DEEP MULTITASK NETWORKS

(71) Applicant: Magic Leap, Inc., Plantation, FL (US)

(72) Inventors: Zhao Chen, Sunnyvale, CA (US); Vijay Badrinarayanan, Mountain View, CA (US); Andrew Rabinovich, San Francisco, CA (US)

(73) Assignee: Magic Leap, Inc., Plantation, FL (US)

( * ) Notice: Subject to any disclaimer, the term of this patent is extended or adjusted under 35 U.S.C. 154(b) by 754 days.

(21) Appl. No.: 16/169,840

(22) Filed: Oct. 24, 2018

(65) Prior Publication Data

US 2019/0130275 A1    May 2, 2019

Related U.S. Application Data

(60) Provisional application No. 62/695,356, filed on Jul. 9, 2018, provisional application No. 62/628,266, filed
(Continued)

(51) Int. Cl.
*G06N 3/08* (2006.01)
*G06N 3/04* (2006.01)
*G06N 20/00* (2019.01)

(52) U.S. Cl.
CPC ........... *G06N 3/084* (2013.01); *G06N 3/0472* (2013.01); *G06N 20/00* (2019.01)

(58) Field of Classification Search
CPC ...... G06N 3/084; G06N 3/0472; G06N 20/00; G06N 3/0454; G06N 3/0481; G06N 3/0445
See application file for complete search history.

(56) References Cited

U.S. PATENT DOCUMENTS

| 5,291,560 | A | | 3/1994 | Daugman |
| 5,313,559 | A | * | 5/1994 | Ogata ...................... G06N 3/08 706/25 |

(Continued)

FOREIGN PATENT DOCUMENTS

| WO | WO 2014/182769 | 11/2014 |
| WO | WO 2015/161307 | 10/2015 |

(Continued)

OTHER PUBLICATIONS

Polzehl et al., "Adaptive Weights Smoothing with Applications to Image Restoration", Feb. 2000, Journal of the Royal Statistical Society Series B (Statistical Methodology), 62(2):335-354, DOI:10.1111/1467-9868.00235 (Year: 2000).*

(Continued)

*Primary Examiner* — Li B. Zhen
*Assistant Examiner* — Henry Nguyen
(74) *Attorney, Agent, or Firm* — Knobbe, Martens, Olson & Bear, LLP

(57) ABSTRACT

Systems and methods for training a multitask network is disclosed. In one aspect, training the multitask network includes determining a gradient norm of a single-task loss adjusted by a task weight for each task, with respect to network weights of the multitask network, and a relative training rate for the task based on the single-task loss for the task. Subsequently, a gradient loss function, comprising a difference between (1) the determined gradient norm for each task and (2) a corresponding target gradient norm, can be determined. An updated task weight for the task can be determined and used in the next iteration of training the multitask network, using a gradient of the gradient loss function with respect to the task weight for the task.

27 Claims, 16 Drawing Sheets

Related U.S. Application Data on Feb. 8, 2018, provisional application No. 62/599,693, filed on Dec. 16, 2017, provisional application No. 62/577,705, filed on Oct. 26, 2017.

(56) References Cited

U.S. PATENT DOCUMENTS

| | | | |
|---|---|---|---|
| 5,583,795 | A | 12/1996 | Smyth |
| 6,850,221 | B1 | 2/2005 | Tickle |
| D514,570 | S | 2/2006 | Ohta |
| 7,771,049 | B2 | 8/2010 | Knaan et al. |
| 7,970,179 | B2 | 6/2011 | Tosa |
| 8,098,891 | B2 | 1/2012 | Lv et al. |
| 8,248,458 | B2 | 8/2012 | Schowengerdt et al. |
| 8,341,100 | B2 | 12/2012 | Miller et al. |
| 8,345,984 | B2 | 1/2013 | Ji et al. |
| 8,363,783 | B2 | 1/2013 | Gertner et al. |
| 8,845,625 | B2 | 9/2014 | Angeley et al. |
| 8,950,867 | B2 | 2/2015 | Macnamara |
| 9,081,426 | B2 | 7/2015 | Armstrong |
| 9,104,186 | B2 * | 8/2015 | Sinyavskiy ............ G06N 3/049 |
| 9,141,916 | B1 | 9/2015 | Corrado et al. |
| 9,215,293 | B2 | 12/2015 | Miller |
| 9,262,680 | B2 | 2/2016 | Nakazawa et al. |
| D752,529 | S | 3/2016 | Loretan |
| 9,310,559 | B2 | 4/2016 | Macnamara |
| 9,348,143 | B2 | 5/2016 | Gao et al. |
| D758,367 | S | 6/2016 | Natsume |
| D759,657 | S | 7/2016 | Kujawski et al. |
| 9,417,452 | B2 | 8/2016 | Schowengerdt et al. |
| 9,430,829 | B2 | 8/2016 | Madabhushi et al. |
| 9,470,906 | B2 | 10/2016 | Kaji et al. |
| 9,547,174 | B2 | 1/2017 | Gao |
| 9,671,566 | B2 | 6/2017 | Abovitz et al. |
| D794,288 | S | 8/2017 | Beers et al. |
| 9,740,006 | B2 | 8/2017 | Gao |
| 9,791,700 | B2 | 10/2017 | Schowengerdt et al. |
| D805,734 | S | 12/2017 | Fisher et al. |
| 9,851,563 | B2 | 12/2017 | Gao et al. |
| 9,857,591 | B2 | 1/2018 | Welch |
| 9,874,749 | B2 | 1/2018 | Bradski |
| 10,074,038 | B2 * | 9/2018 | Hsieh ................... G06T 7/0002 |
| 10,713,794 | B1 * | 7/2020 | He ....................... G06N 3/0454 |
| 10,762,425 | B2 * | 9/2020 | Liu ............................ G06T 7/90 |
| 10,783,394 | B2 * | 9/2020 | Molchanov ............ G06N 3/08 |
| 2004/0130680 | A1 | 7/2004 | Zhou et al. |
| 2006/0028436 | A1 | 2/2006 | Armstrong |
| 2006/0088193 | A1 | 4/2006 | Muller et al. |
| 2006/0147094 | A1 | 7/2006 | Yoo |
| 2007/0052672 | A1 | 3/2007 | Ritter et al. |
| 2007/0081123 | A1 | 4/2007 | Lewis |
| 2007/0110292 | A1 * | 5/2007 | Bi ....................... G06K 9/6282 |
| | | | 382/128 |
| 2007/0140531 | A1 | 6/2007 | Hamza |
| 2007/0189742 | A1 | 8/2007 | Knaan et al. |
| 2009/0129591 | A1 | 5/2009 | Hayes et al. |
| 2009/0141947 | A1 | 6/2009 | Kyyko et al. |
| 2009/0163898 | A1 | 6/2009 | Gertner et al. |
| 2010/0014718 | A1 | 1/2010 | Sawides et al. |
| 2010/0079356 | A1 | 4/2010 | Hoellwarth |
| 2010/0131096 | A1 | 5/2010 | Koyano |
| 2010/0208951 | A1 | 8/2010 | Williams et al. |
| 2010/0232654 | A1 | 9/2010 | Rahmes et al. |
| 2010/0284576 | A1 | 11/2010 | Tosa |
| 2011/0182469 | A1 | 7/2011 | Ji et al. |
| 2011/0202046 | A1 | 8/2011 | Angeley et al. |
| 2012/0127062 | A1 | 5/2012 | Bar-Zeev |
| 2012/0162549 | A1 | 6/2012 | Gao et al. |
| 2012/0163678 | A1 | 6/2012 | Du et al. |
| 2012/0164618 | A1 | 6/2012 | Kullok |
| 2013/0013275 | A1 | 1/2013 | Natarajan |
| 2013/0082922 | A1 | 4/2013 | Miller |
| 2013/0117377 | A1 | 5/2013 | Miller |
| 2013/0125027 | A1 | 5/2013 | Abovitz |
| 2013/0159939 | A1 | 6/2013 | Krishnamurthi |
| 2013/0208234 | A1 | 8/2013 | Lewis |
| 2013/0242262 | A1 | 9/2013 | Lewis |
| 2014/0071539 | A1 | 3/2014 | Gao |
| 2014/0126782 | A1 | 5/2014 | Takai et al. |
| 2014/0161325 | A1 | 6/2014 | Bergen |
| 2014/0177023 | A1 | 6/2014 | Gao et al. |
| 2014/0218468 | A1 | 8/2014 | Gao et al. |
| 2014/0267420 | A1 | 9/2014 | Schowengerdt |
| 2014/0270405 | A1 | 9/2014 | Derakhshani et al. |
| 2014/0279774 | A1 | 9/2014 | Wang et al. |
| 2014/0306866 | A1 | 10/2014 | Miller et al. |
| 2014/0380249 | A1 | 12/2014 | Fleizach |
| 2015/0016777 | A1 | 1/2015 | Abovitz et al. |
| 2015/0103306 | A1 | 4/2015 | Kaji et al. |
| 2015/0117760 | A1 | 4/2015 | Wang et al. |
| 2015/0125049 | A1 | 5/2015 | Taigman et al. |
| 2015/0134583 | A1 | 5/2015 | Tamatsu et al. |
| 2015/0154758 | A1 | 6/2015 | Nakazawa et al. |
| 2015/0170002 | A1 | 6/2015 | Szegedy et al. |
| 2015/0178939 | A1 | 6/2015 | Bradski et al. |
| 2015/0205126 | A1 | 7/2015 | Schowengerdt |
| 2015/0222883 | A1 | 8/2015 | Welch |
| 2015/0222884 | A1 | 8/2015 | Cheng |
| 2015/0268415 | A1 | 9/2015 | Schowengerdt et al. |
| 2015/0278642 | A1 | 10/2015 | Chertok et al. |
| 2015/0302652 | A1 | 10/2015 | Miller |
| 2015/0309263 | A2 | 10/2015 | Abovitz et al. |
| 2015/0326570 | A1 | 11/2015 | Publicover et al. |
| 2015/0338915 | A1 | 11/2015 | Publicover et al. |
| 2015/0346490 | A1 | 12/2015 | Tekolste et al. |
| 2015/0346495 | A1 | 12/2015 | Welch et al. |
| 2016/0011419 | A1 | 1/2016 | Gao |
| 2016/0012292 | A1 | 1/2016 | Perna et al. |
| 2016/0012304 | A1 | 1/2016 | Mayle et al. |
| 2016/0026253 | A1 | 1/2016 | Bradski |
| 2016/0034679 | A1 | 2/2016 | Yun et al. |
| 2016/0034811 | A1 | 2/2016 | Paulik et al. |
| 2016/0035078 | A1 | 2/2016 | Lin et al. |
| 2016/0098844 | A1 | 4/2016 | Shaji et al. |
| 2016/0104053 | A1 | 4/2016 | Yin |
| 2016/0104056 | A1 * | 4/2016 | He ....................... G06K 9/4609 |
| | | | 382/158 |
| 2016/0135675 | A1 | 5/2016 | Du et al. |
| 2016/0162782 | A1 | 6/2016 | Park |
| 2016/0189027 | A1 | 6/2016 | Graves et al. |
| 2016/0291327 | A1 | 10/2016 | Kim |
| 2016/0299685 | A1 | 10/2016 | Zhai et al. |
| 2016/0335795 | A1 | 11/2016 | Flynn et al. |
| 2017/0004399 | A1 * | 1/2017 | Kasahara ............ G06N 3/0454 |
| 2017/0053165 | A1 | 2/2017 | Kaehler |
| 2017/0061330 | A1 | 3/2017 | Kurata |
| 2017/0061625 | A1 | 3/2017 | Estrada et al. |
| 2017/0061688 | A1 | 3/2017 | Miller |
| 2017/0147905 | A1 | 5/2017 | Huang et al. |
| 2017/0161506 | A1 | 6/2017 | Gates et al. |
| 2017/0168566 | A1 | 6/2017 | Osterhout et al. |
| 2017/0186236 | A1 | 6/2017 | Kawamoto |
| 2017/0236057 | A1 * | 8/2017 | Lane .................... G06N 3/0454 |
| | | | 706/25 |
| 2017/0262737 | A1 | 9/2017 | Rabinovich |
| 2017/0308734 | A1 | 10/2017 | Chalom et al. |
| 2017/0344808 | A1 * | 11/2017 | El-Khamy ......... G06K 9/00228 |
| 2018/0018451 | A1 | 1/2018 | Spizhevoy et al. |
| 2018/0018515 | A1 | 1/2018 | Spizhevoy et al. |
| 2018/0053056 | A1 | 2/2018 | Rabonovich et al. |
| 2018/0060722 | A1 * | 3/2018 | Hwang ................ G06N 3/0454 |
| 2018/0075347 | A1 * | 3/2018 | Alistarh .................. G06N 3/084 |
| 2018/0082172 | A1 | 3/2018 | Patel et al. |
| 2018/0089834 | A1 | 3/2018 | Spizhevoy et al. |
| 2018/0096226 | A1 | 4/2018 | Aliabadi et al. |
| 2018/0121799 | A1 * | 5/2018 | Hashimoto ........... G06F 40/284 |
| 2018/0137642 | A1 | 5/2018 | Malisiewicz et al. |
| 2018/0240041 | A1 * | 8/2018 | Koch ................. G06F 16/24578 |
| 2018/0268220 | A1 | 9/2018 | Lee et al. |
| 2018/0336465 | A1 * | 11/2018 | Kim ....................... G06N 7/005 |
| 2018/0349158 | A1 * | 12/2018 | Swersky ............. G06F 9/45516 |
| 2019/0026884 | A1 * | 1/2019 | Huang .................. G06K 9/6278 |

(56) References Cited

U.S. PATENT DOCUMENTS

| | | | |
|---|---|---|---|
| 2019/0066131 A1* | 2/2019 | Aizono | G06N 5/00 |
| 2019/0073560 A1* | 3/2019 | Matei | G06K 9/4628 |

FOREIGN PATENT DOCUMENTS

| | | | | |
|---|---|---|---|---|
| WO | WO 2015/164807 | | 10/2015 | |
| WO | WO 2018/013199 | | 1/2018 | |
| WO | WO 2018/013200 | | 1/2018 | |
| WO | WO-2018015080 A1 * | | 1/2018 | G06N 3/08 |
| WO | WO 2018/039269 | | 3/2018 | |
| WO | WO 2018/063451 | | 4/2018 | |
| WO | WO 2018/067603 | | 4/2018 | |
| WO | WO 2018/093796 | | 5/2018 | |
| WO | WO 2018/170421 | | 9/2018 | |
| WO | WO 2019/084189 | | 5/2019 | |

OTHER PUBLICATIONS

Baytas et al., "Asynchronous Multi-Task Learning", Sep. 30, 2016, arXiv:1609.09563v1 (Year: 2016).*
Ganin et al., "Unsupervised Domain Adaptation by Backpropagation", Feb. 27, 2015, arXiv: 1409.7495v2 (Year: 2015).*
Kendall et al., "Multi-Task Learning Using Uncertainty to Weigh Losses for Scene Geometry and Semantics", May 19, 2017, arXiv: 1705.07115v1 (Year: 2017).*
Ruder, "An Overview of Multi-Task Learning in Deep Neural Networks", Jun. 15, 2017, arXiv:1706.05098v1 (Year: 2017).*
Kendall, Alex, Yarin Gal, and Roberto Cipolla. "Multi-Task Learning Using Uncertainty to Weigh Losses for Scene Geometry and Semantics." arXiv preprint arXiv:1705.07115 (2017). (Year: 2017).*
Kokkinos I. Ubernet: Training a universal convolutional neural network for low-, mid-, and high-level vision using diverse datasets and limited memory. InProceedings of the IEEE conference on computer vision and pattern recognition Jan. 2017 (pp. 6129-6138). (Year: 2017).*
Pong, Ting Kei, et al. "Trace norm regularization: Reformulations, algorithms, and multi-task learning." SIAM Journal on Optimization 20.6 (2010): 3465-3489. (Year: 2010).*
Badrinarayanan et al., "SegNet: A Deep Convolutional Encoder-Decoder Architecture for Image Segmentation", IEEE (Dec. 8, 2015) arXiv:1511.00561v2 in 14 pages.
Bakker et al., "Task Clustering and Gating for Bayesian Multitask Learning," Journal of Machine Learning Research 4 (2003) 83-99.
Bilen, et al. "Universal representations: The missing link between faces, text, planktons, and cat breeds," University of Oxford, arXiv:1701.07275v1 [csCV] Jan. 25, 2017.
Caruana, "Multitask Learning," School of Computer Science, Carnegie Mellon University, Pittsburgh PA, Machine Learning, 28 41-75 (1997), in 35 pages.
Chen, et al., "GradNorm: Gradient Normalization for Adaptive Loss Balancing in Deep Multitask Networks," Magic Leap, Inc., Nov. 6, 2017. in 16 pages.
Chen, et al., "GradNorm: Gradient Normalization for Adaptive Loss Balancing in Deep Multitask Networks," arXiv:1711.02257v1 [cs.CV] Nov. 7, 2017.
Chen, et al., "GradNorm: Gradient Normalization for Adaptive Loss Balancing in Deep Multitask Networks," arXiv:1711.02257v2 [cs.CV] Dec. 19, 2017.
Chen, et al., "GradNorm: Gradient Normalization for Adaptive Loss Balancing in Deep Multitask Networks," arXiv:1711.02257v3 [cs.CV] Apr. 8, 2018.
Chen, et al., "GradNorm: Gradient Normalization for Adaptive Loss Balancing in Deep Multitask Networks," arXiv:1711.02257v4 [cs.CV] Jun. 12, 2018.
Collobert, et al., "A Unified Architecture for Natural Language Processing: Deep Neural Networks with Multitask Learning," Appearing in Proceedings of the 25th international Conference on Machine Learning, Helsinki, Finland, 2008.
Eigen, et ai., "Predicting Depth, Surface Normals and Semantic Labels with a Common Multi-Scale Convolutional Architecture," Dept. of Computer Science, Courant Institute, New York University, Facebook AI Research, arXiv:1411.4734v4 [cs.CV] Dec. 17, 2015.
Graves, et al., "Automated Curriculum Learning for Neural Networks," arXiv:1704.03003v1 [cs.NE] Apr. 10, 2017.
Hashimoto, et al., "A Joint Many-Task Model: Growing a Neural Network for Multiple NLP Tasks," Proceedings of the 2017 Conference on Empirical Methods in Natural Language Processings, pp. 1923-1933, Copenhagen, Denmark Sep. 7-11, 2017.
He et al., "Deep Residual Learning for image Recognition." Microsoft Research, arXiv:1512.03385v1 [cs.CV] Dec. 10, 2015.
He et al. "Mask R-CNN," arXiv:1703.06870v3 [cs.CV] Jan. 24, 2018.
Huang, et al., "Deep Architecture for Traffic Flow Prediction: Deep Belief Networks With Multitask Learning," IEEE Transactions on Intelligent Transportation Systems, vol. 15, No. 5, Oct. 2014.
Ioffe S. et al., "Batch Normalization: Accelerating Deep Network Training by Reducing Internal Covariate Shift", arXiv:1502.03167v3 [cs.LG] Mar. 2, 2015.
Jacob, et al., "Clustered Multi-Task Learning: a Convex Formulation," arXiv:0809.2085v1 [cs.LG] Sep. 11, 2008.
Kang, et al., "Learning with Whom to Share in Multi-task Feature Learning," Appearing in Proceedings of the 28th International Conference on Machine Learning, Bellevue WA, USA, 2011.
Kendall et al. "Multi-Task Learning Usine Uncertainty to Weigh Losses for Scene Geometry and Semantics," arXiv.1705.07115v3 [cs.CV] Apr. 24, 2018.
Kokkinos, "UberNet: Training a 'Universal' Convolutional Neural Network for low-, Mid-, and High-Level Vision using Diverse Datasets and Limited Memory," arXiv:1609.02132v1 [cs.CV] Sep. 7, 2016.
Lee et al. "RoomNet: End-to-End Room Layout Estimation," arXiv:1703.06241v2 [cs.CV] Aug. 7, 2017.
Long et al., "Fully Convolutional Networks for Semantic Segmentation," Proceedings of the IEEE Conference on Computer Vision and Pattern Recognition (Jun. 7-12, 2015) in 10 pages.
Long, et al. "Learning Multiple Tasks with Deen Relationship Networks," arXiv:1506.02117v2 [cs.LG] Feb. 16, 2017.
Lu, et al. "Fully-adaptive Feature Sharing in Multi-Task Networks with Applications in Person Attribute Classification," IEEE Xplore, pp. 5334-5343.
Misra, et al. "Cross-stich Networks for Multi-task Learning," arXiv:1604.03539v1 [cs.CV] Apr. 12, 2016.
Redmon, et al. "YOL09000: Better, Faster, Stronger," arXiv:1612.08242v1 [cs.CV] Dec. 25, 2016.
Selizer, et al., "Multi-Task Learning in Deep Neural Networks for Improved Phoneme Recognition." IEEE, ICASSP 2013, pp. 6965-6969.
Silberman, et al., "Indoor Segmentation and Support inference from RGBD images," ECCV-12 submission ID 1079, Oct. 2012, in 14 pages.
Simonyan et al., "Very deep convolutional networks for large-scale imaoe recognition", arXiv e-print arXiv:1409.1556v6, Apr. 10, 2015 in 14pages.
Søgaard, et al., "Deep multi-task learning with low level tasks supervised at lower layers," Proceedings of the 54th Annual Meeting of the Association for Computational Linguistics, pp. 231-235, Berlin, Germany, Aug. 7-12, 2016.
Szegedy et al., "Going deeper with convolutions", arXiv:1409.4842v1, Sep. 17, 2014 in 12 pages.
Teichmann, et al., "MultiNet: Real-time Joint Semantic Reasoning for Autonomous Driving," arXiv:1612.07695v2 [cs.CV] May 8, 2018.
Warde-Farley, et al., "Self-Informed Neural Network Structure Learning," Accepted as a workshop contribution at ICLR 2015, arXiv:1412.6563v2 [stat.ML] Apr. 13, 2015.
Wu, et al., "Deep neural networks employing multi-task learning and stacked bottleneck features for speech synthesis," Acoustics, Speech and Signal Processing (ICASSP), 2015 IEEE International.
Zhang, et al., "Facial Landmark Detection by Deep Multi-task Learning," https://www.researchgate..net/publication/264786906, conference paper Sep. 2014.

(56) References Cited

OTHER PUBLICATIONS

"Camera Calibration and 3D Reconstruction", OpenCV, retrieved May 5, 2016, from <http://docs.opencv.org/2.4/modules/callb3d/doc/camera_calibration_and_3d_reconstruction.html> in 53 pages.
"Camera calibration with OpenCV", OpenCV, retrieved May 5, 2016, in 12 pages. URL: http://docs.opencv.org/2.4/doc/tutorials/calib3d/camera_calibration/camera_calibration.html.
"Camera calibration with OpenCV", OpenCV, retrieved May 5, 2016, in 7 pages. URL: http://docs.opencv.org/3.1.0/d4/d94/tutorial_camera_calibration.html#gsc.tab=0.
"Convolution", Wikipedia, accessed Oct. 1, 2017, in 17 pages. URL: https://en.wikipedia.org/wiki/Convolution.
"Deep Learning", Wikipedia, printed Oct. 3, 2017, in 23 pages. URL: https://en.wikipedia.org/wiki/Deep_learning.
"Feature Extraction Using Convolution", Ufldl, printed Sep. 1, 2016, in 3 pages. URL:http://deeplearning.stanford.edu/wiki/index.php/Feature_extraction_using_convolution.
"Machine Learning", Wikipedia, printed Oct. 3, 2017, in 14 pages. URL: https://en.wikipedia.org/wiki/Machine_learning.
"Transfer Function Layers", GitHub, Dec. 1, 2015, in 13 pages; accessed URL: http://github.com/torch/nn/blob/master/doc/transfer.md.
Adegoke et al., "Iris Segmentation: A Survey". Int J Mod Engineer Res. (IJMER) (Aug. 2013) 3(4): 1885-1889.
Anthony, S., "MIT releases open-source software that reveals invisible motion and detail in video", Extreme Tech, Feb. 28, 2013, as archived Aug. 4, 2017, in 5 pages.
Arevalo J et al., "Convolutional neural networks for mammography mass lesion classification", in *Engineering in Medicine and Biology Society* (EMBC); 37th Annual international Conference IEEE, Aug. 25-29, 2015, pp. 797-800.
Aubry M. et al., "Seeing 3D chairs: e empiar part-based 2D-3D alignment using a large dataset of CAD models", Proceedings of the IEEE Conference on Computer Vision and Pattern Recognition (Jun. 23-28, 2014); Computer Vision Foundation—Open Access Version in 8 pages.
Azizpour, et al.: "From Generic to Specific Deep Representations for Visual Recognition," ResearchGate. Jun. 22, 2014: https://www.researchgate.net/publication/263352539 retrieved on Apr. 27, 2016.
Badrinarayanan et al., "SegNet: A Deep Convolutional Encoder-Decoder Architecture for image Segmentation", TPAMI, vol. 39, No. 12, Dec. 2017.
Bansal A. et al., "Marr Revisited: 2D-3D Alignment via Surface Normal Prediction", Proceedings of the IEEE Conference on Computer Vision and Pattern Recognition (Jun. 27-30, 2016) pp. 5965-5974.
Belagiannis V. et al., "Recurrent Human Pose Estimation", In Automatic Face & Gesture Recognition; 12th IEEE International Conference -May 2017, arXiv eprint arXiv:1605.02914v3; (Aug. 5, 2017) Open Access Version in 8 pages.
Bell S. et al., "Inside-Outside Net: Detecting Objects in Conte t with Skip Pooling and Recurrent Neural Networks", In Proceedings of the IEEE Conference on Computer Vision and Pattern Recognition, Jun. 27-30, 2016; pp. 2874-2883.
Biederman I., "Recognition-by-Components: A Theory of Human Image Understanding", Psychol Rev. (Apr. 1987) 94(2): 115-147.
Bouget, J., "Camera Calibration Toolbox for Matlab" Cal-Tech, Dec. 2, 2013, in 5 pages. URL: https://www.vision.caltech.edu/bouguetj/calib_doc/index.html#parameters.
Bulat A. et al., "Human pose estimation via Convolutional Part Heatmap Regression", arXiv e-print arXiv: 609.01743v1, Sep. 6, 2016 in 16 pages.
Carreira J. et al., "Human Pose Estimation with Iterative Error Feedback", In Proceedings of the IEEE Conference on Computer Vision and Pattern Recognition, Jun. 27-30, 2016, pp. 4733-4742.
Chatfield et al., "Return of the Devil in the Details: Delving Deep into Convolutional Nets", arXiv eprint arXiv:1405.3531v4, Nov. 5, 2014 in 11 pages.

Chen et al., "Semantic Image Seamentation With Deep Convolutional Nets and Fully Connected CRFs," In ICLR, arXiv:1412.7062v3 [cs.CV] Apr. 9, 2015.
Chen X. et al., "3D Object Proposals for Accurate Object Class Detection", in *Advances in Neural Information Processing Systems*, (2015) Retrieved from <http://papers.nips.cc/paper/5644-3d-object-proposals-for-accurate-object-class-detection.pdf>; 11 pages.
Choy et al., "3D-R2N2: A Unified Approach for Single and Multi-view 3D Object Reconstruction", arXiv; eprint arXiv: 604.00449v1, Apr. 2, 2016 in 17 pages.
Collet et al., "The MOPED framework: Object Recognition and Pose Estimation for Manipulation", The International Journal of Robotics Research. (Sep. 2011) 30(10):1284-306; preprint Apr. 11, 2011 in 22 pages.
Coughlan et al., "The Manhattan World Assumption: Regularities in scene statistics which enable bayesian inference," In NIPS, 2000.
Crivellaro A et al., "A Novel Representation of Parts for Accurate 3D Object Detection and Tracking in Monocular Images", In *Proceedings of the IEEE International Conference on Computer Vision*; Dec. 7-13, 2015 (pp. 4391-4399).
Dai J. et al., "Instance-aware Semantic Segmentation via Multi-task Network Cascades", In *Proceedings of the IEEE Conference on Computer Vision and Pattern Recognition*; Jun. 27-30, 2016 (pp. 3150-3158).
Dai J. et al., "R-FCN: Object Detection via Region-based Fully Convolutional Networks", in *Advances in neural information processing systems*;, (Jun. 21, 2016) Retrieved from <https://arxiv.org/pdf/1605.06409.pdf in 11 pages.
Dasgupta et al., "Delay: Robust Spatial Layout Estimation for Cluttered Indoor Scenes," In CVPR, 2016.
Daugman, J., "How Iris Recognition Works", IEEE Transactions on Circuits and Systems for Video Technology, vol. 14, No. 1, Jan. 2004, in 10 pages.
Daugman, J., "New Methods in Iris Recognition," IEEE Transactions on Systems, Man, and Cybernetics—Part B: Cybernetics, vol. 37, No. 5, Oct. 2007, in 9 pages.
Daugman, J., "Probing the Uniqueness and Randomness of IrisCodes: Results From 200 Billion Iris Pair Comparisons," Proceedings of the IEEE, vol. 94, No. 11, Nov. 2006, in 9 pages.
Del Pero et al., "Bayesian geometric modeling of indoor scenes," In CVPR, 2012.
Del Pero et al., "Understanding bayesian rooms using composite 3d object models," In CVPR, 2013.
Detone D. et al., "Deep Image Homography Estimation", arXiv eprint arXiv:1606.03798v1, Jun. 13, 2016 in 6 pages.
Dwibedi et al., "Deep Cuboid Detection: Beyond 2D Bounding Boxes", arXiv eprint arXiv:1611.10010v1; Nov. 30, 2016 in 11 pages.
Everingham M et al., "The PASCAL Visual Object Classes (VOC) Challenge". Int J Comput Vis (Jun. 2010) 88(2):303-38.
Farabet, C. et al., "Hardware Accelerated Convolutional Neural Networks for Synthetic Vision Systems", Proceedings of the 2010 IEEE International Symposium (May 30, 2010-Jun. 2, 2010) Circuits and Systems (ISCAS), pp. 257-260.
Fidler S. et al., "3D Object Detection and Viewpoint Estimation with a Deformable 3D Cuboid Model", Proceedings of the 25th International Conference on Neural Information Processing Systems, (Dec. 3-6, 2012), pp. 611-619.
Fouhey D. et al., "Data-Driven 3D Primitives for Single Image Understanding", Proceedings of the IEEE International Conference on Computer Vision, Dec. 1-8, 2013; pp. 3392-3399.
Geiger A. et al., "Joint 3D Estimation of Objects and Scene Layout", In Advances in Neural Information Processing Systems 24; Dec. 17, 2011 in 9 pages.
Gidaris S. et al., "Object detection via a multi-region & semantic segmentation-aware CNN model", in Proceedings of the IEEE International Conference on Computer Vision; Dec. 7-13. 2015 (pp. 1134-1142).
Girshick R. et al., "Fast R-CNN", Proceedings of the IEEE International Conference on Computer Vision; Dec. 7-13, 2015 (pp. 1440-1448).

(56) References Cited

OTHER PUBLICATIONS

Girshick R. et al., "Rich feature hierarchies for accurate object detection and semantic segmentation", Proceedings of the IEEE Conference on Computer Vision and Pattern Recognition, Jun. 23-28, 2014 (pp. 580-587).
Gupta A. et al., "Blocks World Revisited: Image Understanding Using Qualitative Geometry and Mechanics", in European Conference on Computer Vision; Sep. 5, 2010 in 14 pages.
Gupta A. et al., "From 3D Scene Geometry to Human Workspace", in Computer Vision and Pattern Recognition (CVPR); IEEE Conference on Jun. 20-25, 2011 (pp. 1961-1968).
Gupta et al., "Perceptual Organization and Recognition of Indoor Scenes from RGB-D Images," In CVPR, 2013.
Gupta S. et al., "Aligning 3D Models to RGB-D images of Cluttered Scenes", in Proceedings of the IEEE Conference on Computer Vision and Pattern Recognition, Jun. 7-12, 2015 (pp. 4731-4740).
Gupta S. et al., "Inferring 3D Object Pose in RGB-D Images", arXiv e-print arXiv: 1502.04652v1, Feb. 16, 2015 in 13 pages.
Gupta S. et al., "Learning Rich Features from RGB-D Images for Object Detection and Segmentation", in *European Conference on Computer Vision*; (Jul. 22, 2014); Retrieved from <https://arxiv.org/pdf/1407.5736.pdf> in 16 pages.
Han et al., "Deep Compression: Compressing Deep Neural Networks with Pruning, Trained Quantization and Huffman Coding", arXiv eprint arXiv:1510.00149v5, Feb. 15, 2016 in 14 pages.
Hansen, D. et al., "In the Eye of the Beholder: A Survey of Models for Eyes and Gaze", IEEE Transactions on Pattern Analysis and Machine Intelligence, vol. 32, No. 3, , Mar. 2010, in 23 pages.
Hartley R. et al., *Multiple View Geometry in Computer Vision*, 2nd Edition; Cambridge University Press, (Apr. 2004); in 673 pages.
He et al., "Deep Residual Learning for Image Recognition," In CVPR, 2016.
He et al., "Delving Deep into Rectifiers: Surpassing Human-level Performance on ImageNet Classification", arXiv: eprint arXiv:1502.01852v1, Feb. 6, 2015 in 11 pages.
He et al., "Spatial Pyramid Pooling in Deep Convolutional Networks for Visual Recognition", arXiv eprint arXiv:1406.4729v2; Aug. 29, 2014 in 14 pages.
Hedau et al., "Recovering the Spatial Layout of Cluttered Rooms," In ICCV, 2009.
Hedau V. et al., "Recovering Free Space of Indoor Scenes from a Single Image", in *Computer Vision and Pattern Recognition* (CVPR), IEEE Conference Jun. 16-21, 2012 (pp. 2807-2814).
Hejrati et al., "Categorizing Cubes: Revisiting Pose Normalization", Applications of Computer Vision (WACV), 2016 IEEE Winter Conference, Mar. 7-10, 2016 in 9 pages.
Hijazi, S. et al., "Using Convolutional Neural Networks for Image Recognition", Tech Rep. (Sep. 2015) available online URL: http://ip.cadence.com/uploads/901/cnn-wp-pdf, in 12 pages.
Hochreiter et al., "Long Short-Term Memory," Neural computation, 9, 1735-1780, 1997.
Hoffer et al., "Deep Metric Learning Using Triplet Network", International Workshop on Similarity-Based Pattern Recognition [ICLR]; Nov. 25, 2015; [online] retrieved from the internet <https://arxiv.org/abs/1412.6622>; pp. 84-92.
Hoiem D. et al., "Representations and Techniques for 3D Object Recognition and Scene Interpretation", Synthesis Lectures on Artificial Intelligence and Machine Learning, Aug. 2011, vol. 5, No. 5, pp. 1-169; Abstract in 2 pages.
Hsiao E. et al., "Making specific features less discriminative to improve point-based 3D object recognition", in *Computer Vision and Pattern Recognition* (CVPR), IEEE Conference, Jun. 13-18, 2010 (pp. 2653-2660).
Huang et al., "Sign Language Recognition Using 3D Convolutional Neural Networks", University of Science and Technology of China, 2015 IEEE International Conference on Multimedia and Expo. Jun. 29, 2015-Jul. 3, 2015, in 6 pages.
Iandola F. et ai., "SqueezeNet: AlexNet-level accuracy with 50x fewer parameters and <1MB model size", arXiv eprint arXiv:1602.07360v1, Feb. 24, 2016 in 5 pages.

"Inductive transfer", Wikipedia printed Apr. 27, 2016, in 3 pages, URL: https://en.wikipedia.org/w/indes.php?title=Inductive_transfer&oldid=71711292.
Izadinia et al., "IM2CAD," arXiv preprint arXiv:1608.05137, 2016.
Jarrett et al., "What is the Best Multi-Stage Architecture for Object Recognition?", In Computer Vision IEEE. 12th International Conference Sep. 29, 2009-Oct. 2, 2009, pp. 2146-2153.
Ji, H. et al., "3D Convolutional Neural Networks for Human Action Recognition", IEEE Transactions on Pattern Analysis and Machine Intelligence, vol. 35:1, Jan. 2013, in 11 pages.
Jia et al., "3D-Based Reasoning with Blocks, Support, and Stability", Proceedings of the IEEE Conference on Computer Vision and Pattern Recognition; Jun. 23-28, 2013 in 8 pages.
Jia et al., "Caffe: Convolutional Architecture for Fast Feature Embedding", arXiv e-print arXiv:1408.5093v1, Jun. 20, 2014 in 4 pages.
Jiang H. et ai., "A Linear Approach to Matching Cuboids in RGBD Images", in *Proceedings of the IEEE Conference on Computer Vision and Pattern Recognition*. Jun. 23-28, 2013 (pp. 2171-2178).
Jillela et al., "An Evaluation of Iris Segmentation Algorithms in Challenging Periocular Images", Handbook of Iris Recognition, Springer Verlag, Heidelberg (Jan. 12, 2013) in 28 pages.
Kar A. et al., "Category-specific object reconstruction from a single image", in *Proceedings of the IEEE Conference on Computer Vision and Pattern Recognition*. Jun. 7-12, 2015 (pp. 1966-1974).
Krizhevsky et al., "ImageNet Classification with Deep Convolutional Neural Networks", Advances in Neural Information Processing Systems. Apr. 25, 2013, pp. 1097-1105.
Lavin, A. et al.: "Fast Algorithms for Convolutional Neural Networks", Proceedings of the IEEE Conference on Computer Vision and Pattern Recognition, arXiv: eprint arXiv:1509.09308v2; Nov. 10, 2016 in 9 pages.
Lee D. et al., "Geometric Reasoning for Single Image Structure Recovery", in IEEE Conference Proceedings in Computer Vision and Pattern Recognition (CVPR) Jun. 20-25, 2009, pp. 2136-2143.
Lee et al., "Deeply-Supervised Nets," In AISTATS, San Diego, CA 2015, JMLR: W&Cp vol. 38.
Lee et al., "Estimating Spatial Layout of Rooms using Volumetric Reasoning about Objects and Surfaces," In NIPS, 2010.
Lee et al., "Generalizing Pooling Functions in Convolutional Neural Networks: Mixed, Gated, and Tree," In AISTATS, Gadiz, Spain, JMLR: W&CP vol. 51, 2016.
Lee et al., "Recursive Recurrent Nets with Attention Modeling for OCR in the Wild," In CVPR, 2016.
Liang et al., "Recurrent Convolutional Neural Network for Object Recognition," In CVPR, 2015.
Lim J. et al., "FPM: Fine pose Parts-based Model with 3D CAD models", European Conference on Computer Vision; Springer Publishing, Sep. 6, 2014, pp. 478-493.
Liu et al., "ParseNet: Looking Wider to See Better", arXiv eprint arXiv: 1506.04579v1; Jun. 15, 2015 in 9 pages.
Liu et al., "Rent3d: Floor-Plan Priors for Monocular Layout Estimation," In CVPR, 2015.
Liu W. et al., "SSD: Single Shot MultiBox Detector", arXiv e-print arXiv:1512.02325v5, Dec. 29, 2016 in 17 pages.
Mallya et al., "Learning Informative Edge Maps for Indoor Scene Layout Prediction," In ICCV, 2015.
Mirowski et al., "Learning to Navigate in Complex Environments," In ICLR, 2017.
Nair et al., "Rectified Linear Units Improve Restricted Boltzmann Machines," In ICML, Haifa, Israel 2010.
Newell et al., "Stacked Hourglass Networks for Human Pose Estimation." In ECCV, ArXiv:1603.06937v2 [cs.CV] 2016.
Noh et al., "Learning Deconvolution Network for Semantic Segmentation," In ICCV, 2015.
Oberweger et al., "Training a Feedback Loop for Hand Pose Estimation," In ICCV, 2015.
Pavlakos G. et al., "6-dof object pose from semantic keypoints", in arXiv preprint Mar. 14, 2017; Retrieved from <http://www.cis.upenn.edu/~kostas/mypub.dir/pavlakos17icra.pdf> in 9 pages.
Peng et al., "A Recurrent Encoder-Decoder Network for Sequential Face Alignment," In ECCV, arXiv:1608.05477v2 [cs.CV] 2016.

(56) References Cited

OTHER PUBLICATIONS

Pfister et al., "Flowing Convnets for Human Pose Estimation in Videos," In ICCV, 2015.
Ramalingam et al., "Manhattan Junction Catalogue for Spatial Reasoning of Indoor Scenes," In CVPR, 2013.
Rastegari M. et al., "XNOR-Net: ImageNet Classification Using Binary Convolutional Neural Networks", arXiv eprint arXiv:1603.05279v4; Aug. 2, 2016 in 17 pages.
Redmon J. et al., "You Only Look Once: Unified, Real-Time Object Detection", Proceedings of the IEEE Conference on Computer Vision and Pattern Recognition (Jun. 27-30, 2016) pp. 779-788.
Ren et al., "A Coarse-to-Fine Indoor Layout Estimation (CFILE) Method," In ACCV, arXiv:1607.00598v1 [cs.CV] 2016.
Ren S. et al., "Faster R-CNN: Towards real-time object detection with region proposal networks", arXiv eprint arXiv:1506.01497v3; Jan. 6, 2016 in 14 pages.
Ren, J. et al.: "On Vectorization of Deep Convolutional Neural Networks for Vision Tasks," Association for the Advancement of Artificial Intelligence; arXiv: eprint arXiv:1501.07338v1, Jan. 29, 2015 in 8 pages.
Roberts L. et al., "Machine Perception of Three-Dimensional Solids", Doctoral Thesis MIT; Jun. 1963 in 82 pages.
Rubinstein, M., "Eulerian Video Magnification", YouTube, published May 23, 2012, as archived Sep. 6, 2017, in 13 pages (with video transcription). URL: https://web.archive.org/web/20170906180503/https://www.youtube.com/watch?v=ONZcjs1Pjmk&feature=youtu.be.
Russell et al., "Labelme: a database and web-based tool for image annotation," IJCV, vol. 77, Issue 1-3, pp. 157-173, May 2008.
Savarese S. et al., "3D generic object categorization, localization and pose estimation", in *Computer Vision*, IEEE 11th International Conference; Oct. 14-21, 2007, in 8 pages.
Saxena A., "Convolutional Neural Networks (CNNS): An Illustrated Explanation", Jun. 29, 2016 in 16 pages; Retrieved from <http://xrds.acm.org/blog/2016/06/convolutional-neural-networks-cnns-illustrated-explanation/>.
Schroff et al., "FaceNet: A unified embedding for Face Recognition and Clustering", arXiv eprint arXiv:1503.03832v3, Jun. 17, 2015 in 10 pages.
Schwing et al., "Efficient Structured Prediction for 3D Indoor Scene Understanding," In CVPR, 2012.
Shafiee et al., "ISAAC: A Convolutional Neural Network Accelerator with In-Situ Analog Arithmetic in Crossbars", ACM Sigarch Comp. Architect News (Jun. 2016) 44(3):14-26.
Shao T. et al., "Imagining the Unseen: Stability-based Cuboid Arrangements for Scene Understanding", ACM Transactions on Graphics. (Nov. 2014) 33(6) in 11 pages.
Shi et al., "Convolutional LSTM Network: A Machine Learning Aoproach for Precipitation Nowcasting." In NIPS, 2015.
Song S. et al., "Deep Sliding Shapes for Amodal 3D Object Detection in RGB-D Images", Proceedings of the IEEE Conference on Computer Vision and Pattern Recognition. June 27-30. 2016 (pp. 808-816).
Song S. et al., "Sliding Shapes for 3D Object Detection in Depth Images", in European Conference on Computer Vision, (Sep. 6, 2014) Springer Publishing (pp. 634-651).
Song et al., "Sun RGB-D: A RGB-D Scene Understanding Benchmark Suite," In CVPR, 2015.
Su H. et al., "Render for CNN: Viewpoint Estimation in Images Using CNNs Trained with Rendered 3D Model Views", in Proceedings of the IEEE international Conference on Computer Vision, Dec. 7-13, 2015 (pp. 2686-2694).
Szegedy et al., "Going Deeper with Convolutions," In CVPR, 2015, in 9 pages.
Szegedy et al., "Rethinking the inception Architecture for Computer Vision", arXiv eprint arXIV:1512.00567v3, Dec. 12, 2015 in 10 pages.
Tompson et al., "Joint Training of a Convolutional Network and a Graphical Model for Human Pose Estimation," In NIPS, 2014.
Tu et al., "Auto-context and its Application to High-level Vision Tasks," In CVPR. 2008. 978-1-4244-2243-2/08, IEEE.
Tulsiani S. et al., "Viewpoints and Keypoints", Proceedings of the IEEE Conference on Computer Vision and Pattern Recognition; Jun. 7-12, 2015 (pp. 1510-1519).
Villanueva, A. et al., "A Novel Gaze Estimation System with One Calibration Point", IEEE Transactions on Systems, Man, and Cybernetics-Part B:Cybernetics, vol. 38:4, Aug. 2008, in 16 pages.
Wilczkowiak M. et al., "Using Geometric Constraints Through Parallelepipeds for Calibration and 3D Modelling", IEEE Transactions on Pattern Analysis and Machine Intelligence—No. 5055 (Nov. 2003) 27(2) in 53 pages.
Wu J. et al., "Single image 3D interpreter Network", European Conference in Computer Vision; arXiv eprint arXiv:1604.08685v2, Oct. 4, 2016 in 18 pages.
Xiang Y. et al., "Data-Driven 3D Voxel Patterns for Object Category Recognition", in Proceedings of the IEEE Conference on Computer Vision and Pattern Recognition, Jun. 7-12, 2015 (pp. 1903-1911).
Xiao J. et al., "Localizing 3D cuboids in single-view images", in Advances in Neural Information Processing Systems; Apr. 25, 2013 in 9 pages.
Xiao et al., "Reconstructing the Worlds Museums," IJCV, 2014.
Xiao et al., "Sun database: Large-scale scene recognition from abbey to zoo," In CVPR, 2010 IEEE Conference on 2010, 3485-3492.
Yang Y. et al., "Articulated human detection with flexible mixtures of parts", IEEE Transactions on Pattern Analysis and Machine Intelligence. Dec. 2013; 35(12):2878-90.
Yosinski, et al.: "How transferable are features in deep neural networks?" In Advances in Neural Information Processing Systems 27 (NIPS '14), NIPS Foundation, 2014.
Zhang et al., "Estimating the 3D Layout of Indoor Scenes and its Clutter from Depth Sensors," In ICCV, 2013.
Zhang et al., Large-scale Scene Understanding Challenge: Room Layout Estimation, 2016.
Zhao et al., "Scene Parsing by Integrating Function, Geometry and Appearance Models." In CVPR, 2013.
Zheng et al., "Conditional Random Fields as Recurrent Neural Networks," In CVPR, 2015.
Zheng Y. et al., "Interactive Images: Cuboid Proxies for Smart Image Manipulation", ACM Trans Graph. (Jul. 2012) 31(4):99-109.
International Search Report and Written Opinion for PCT Application No. PCT/US 18/57382, dated Jan. 11, 2019.
International Search Report and Written Opinion for PCT Application No. PCT/US 18/57382, dated Apr. 28, 2020.
ARToolKit: https://web.archive.org/web/20051013062315/http://www.hitl.washington.edu:80/artoolkit/documentation/hardware.htm, archived Oct. 13, 2005.
Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.
Azuma, "Predictive Tracking for Augmented Realty," TR95-007, Department of Computer Science, UNC-Chapel Hill, NC, Feb. 1995.
Bimber, et al., "Spatial Augmented Reality—Merging Real and Virtual Worlds," 2005 https://web.media.mit.edu/~raskar/book/BimberRaskarAugmentedRealityBook.pdf.
Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).
Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).
Xia, et al., "Vehicle Logo Recognition and Attributes Prediction by Multi-task Learning with CNN," 2016 IEEE, 12th International

(56) References Cited

OTHER PUBLICATIONS

Conference on Natural Computation, Fuzzy Systems and Knowledge Discovery (ICNC-FSKD).

* cited by examiner

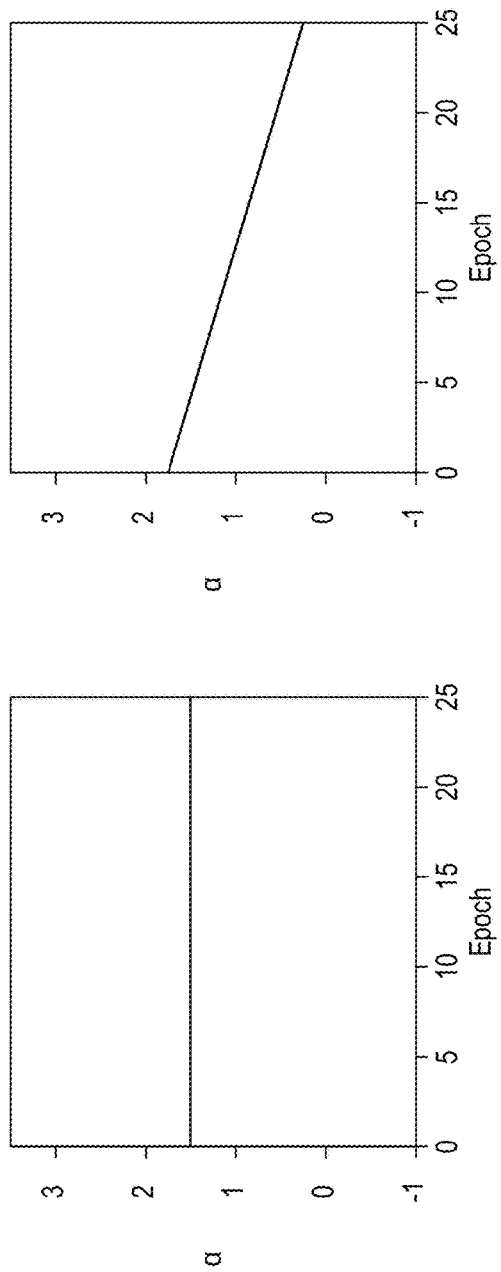
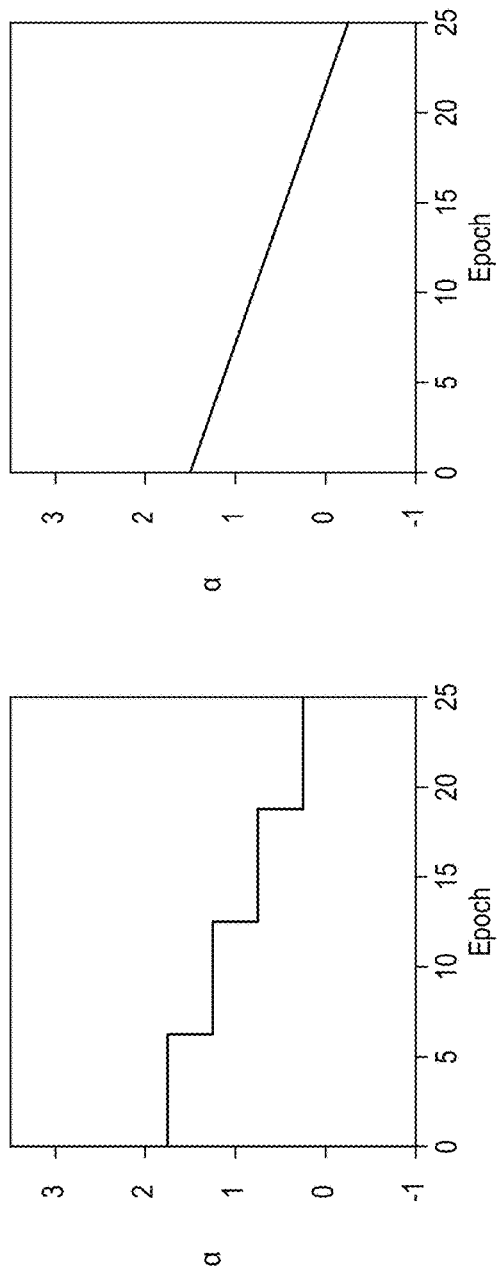
FIG. 7A
FIG. 7B
FIG. 7C
FIG. 7D

GRADIENT NORMALIZATION SYSTEMS AND METHODS FOR ADAPTIVE LOSS BALANCING IN DEEP MULTITASK NETWORKS

CROSS-REFERENCE TO RELATED APPLICATIONS

This application claims the benefit of priority to U.S. Patent Application No. 62/577,705, filed on Oct. 26, 2017, U.S. Patent Application No. 62/599,693, filed on Dec. 16, 2017, U.S. Patent Application No. 62/628,266, filed on Feb. 8, 2018, and U.S. Patent Application No. 62/695,356, filed on Jul. 9, 2018; each of which is entitled "Gradient Normalization Systems and Methods for Adaptive Loss Balancing in Deep Multitask Networks;" and the content of each of which is hereby incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Field

The present disclosure relates generally to systems and methods for machine learning and more particularly to training machine learning models.

Description of the Related Art

A deep neural network (DNN) is a computation machine learning method. DNNs belong to a class of artificial neural networks (NN). With NNs, a computational graph is constructed which imitates the features of a biological neural network. The biological neural network includes features salient for computation and responsible for many of the capabilities of a biological system that may otherwise be difficult to capture through other methods. In some implementations, such networks are arranged into a sequential layered structure in which connections are unidirectional. For example, outputs of artificial neurons of a particular layer can be connected to inputs of artificial neurons of a subsequent layer. A DNN can be a NN with a large number of layers (e.g., 10s, 100s, or more layers).

Different NNs are different from one another in different perspectives. For example, the topologies or architectures (e.g., the number of layers and how the layers are interconnected) and the weights of different NNs can be different. A weight can be approximately analogous to the synaptic strength of a neural connection in a biological system. Weights affect the strength of effect propagated from one layer to another. The output of an artificial neuron can be a nonlinear function of the weighted sum of its inputs. The weights of a NN can be the weights that appear in these summations.

SUMMARY

In one example, a system for training a multitask network can include: non-transitory memory configured to store: executable instructions, and a multitask network for determining outputs associated with a plurality of tasks; and a hardware processor in communication with the non-transitory memory, the hardware processor programmed by the executable instructions to: receive a training image associated with a plurality of reference task outputs for the plurality of tasks; for each task of the plurality of tasks, determine a gradient norm of a single-task loss, of (1) a task output for the task determined using the multitask network with the training image as input, and (2) a corresponding reference task output for the task associated with the training image, adjusted by a task weight for the task, with respect to a plurality of network weights of the multitask network; and determine a relative training rate for the task based on the single-task loss for the task; determine a gradient loss function comprising a difference between (1) the determined gradient norm for each task and (2) a corresponding target gradient norm determined based on (a) an average gradient norm of the plurality of tasks, (b) the relative training rate for the task, and (c) a hyperparameter; determine a gradient of the gradient loss function with respect to a task weight for each task of the plurality of tasks; and determine an updated task weight for each of the plurality of tasks using the gradient of the gradient loss function with respect to the task weight.

In another example, a method for training a multitask network can comprise: receiving a training image of a plurality of training images each associated with a plurality of reference task outputs for the plurality of tasks; for each task of the plurality of tasks, determining a gradient norm of a single-task loss adjusted by a task weight for the task, with respect to a plurality of network weights of the multitask network, the single-task loss being of (1) a task output for the task determined using a multitask network with the training image as input, and (2) a corresponding reference task output for the task associated with the training image; and determining a relative training rate for the task based on the single-task loss for the task; determining a gradient loss function comprising a difference between (1) the determined gradient norm for each task and (2) a corresponding target gradient norm determined based on (a) an average gradient norm of the plurality of tasks, and (b) the relative training rate for the task; and determining an updated task weight for each of the plurality of tasks using a gradient of a gradient loss function with respect to the task weight.

In yet another example, a head mounted display system can comprise: non-transitory memory configured to store executable instructions, and a multitask network for determining outputs associated with a plurality of tasks, wherein the multitask network is trained using: a gradient norm of a single-task loss, of (1) a task output for a task of the plurality of tasks determined using the multitask network with a training image as input, and (2) a corresponding reference task output for the task associated with the training image, adjusted by a task weight for the task, with respect to a plurality of network weights of the multitask network, a relative training rate for the task determined based on the single-task loss for the task, a gradient loss function comprising a difference between (1) the determined gradient norm for the task and (2) a corresponding target gradient norm determined based on (a) an average gradient norm of the plurality of tasks, (b) the relative training rate for the task, and (c) a hyperparameter, an updated task weight for the task using a gradient of the gradient loss function with respect to the task weight for the task; a display; a sensor; and a hardware processor in communication with the non-transitory memory and the display, the hardware processor programmed by the executable instructions to: receive a sensor input captured by the sensor; determine a task output for each task of the plurality of tasks using the multitask network; and cause the display to show information related to the determined task outputs to a user of the augmented reality device.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

FIGS. 2A-2C show the results of gradient normalization (GradNorm) on a 2-task system. FIGS. 2D-2F show the results of gradient normalization on a 10-task system. Diagrams of the network structure with loss scales are shown in FIGS. 2A and 2D, traces of with $w_i(t)$ during training are shown in FIGS. 2B and 2E, and task-normalized test loss curves in FIGS. 2C and 2F. The hyperparameter value $\alpha=0.12$ was used for all example runs.

FIGS. 7A-7D are plots showing examples of how the value of a hyperparameter can be constant during training (e.g., FIG. 7A) or can vary during training (e.g., FIGS. 7B-7D).

Figure 1A:
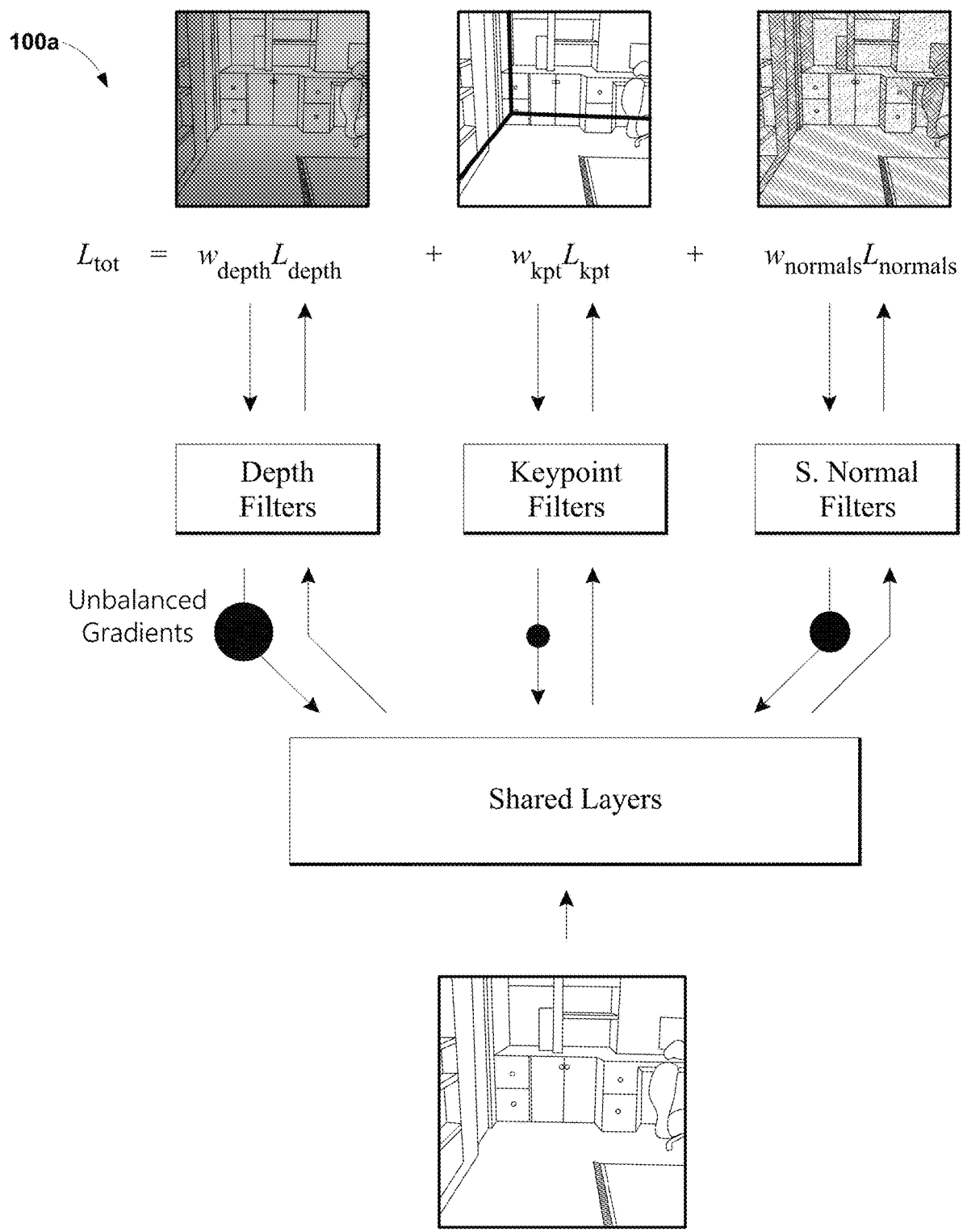
FIG. 1A is an example schematic illustration of imbalanced gradient norms across tasks when training a multitask network.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

Models representing data relationships and patterns, such as functions, algorithms, systems, and the like, may accept input, and produce output that corresponds to the input in some way. For example, a model may be implemented as a machine learning method such as a convolutional neural network (CNN) or a deep neural network (DNN). Deep learning is part of a broader family of machine learning methods based on the idea of learning data representations as opposed to task specific methods and shows a great deal of promise in solving audio-visual computational problems useful for augmented reality, mixed reality, virtual reality, and machine intelligence. In machine learning, a convolutional neural network (CNN, or ConvNet) can include a class of deep, feed-forward artificial neural networks, and CNNs have successfully been applied to analyzing visual imagery. Machine learning methods include a family of methods that can enable robust and accurate solutions to a wide variety of problems, including eye image segmentation or eye tracking.

Disclosed herein are examples of systems and methods for training a multitask network. Deep multitask networks, in which one neural network produces multiple predictive outputs, can offer better speed and performance than their single-task counterparts but need to be trained properly. For example, a deep multitask network can be trained or taught to solve for multiple learning tasks at the same time, while exploiting commonalities and differences across tasks. The multiple tasks can be learned in parallel using a shared representation among the tasks. As an example, a multitask neural network can share hidden layers among all the tasks, while providing respective task-specific output layers (this is sometimes referred to as hard parameter sharing). As another approach, each task can have its own neural network with its own parameters. A regularization constraint can be used across the layers of the task-specific networks to encourage the parameters to be similar (this is sometimes referred to as soft parameter sharing).

Disclosed herein are examples of gradient normalization (GradNorm) methods that automatically balance training in deep multitask models by dynamically tuning gradient magnitudes. For various network architectures, for both regression and classification tasks, and on both synthetic and real datasets, GradNorm can improve accuracy and/or reduce overfitting across multiple tasks when compared to single-task networks, static baselines, and other adaptive multitask loss balancing techniques. GradNorm can match or surpass the performance of exhaustive grid search methods, despite some implementations utilizing only a single asymmetry hyperparameter $\alpha$. Thus, with some embodiments of GradNorm a few training runs may be needed irrespective of the number of tasks. Gradient manipulation can afford great control over the training dynamics of multitask networks and may be enable wide applications of multitask learning.

Single-task learning in computer vision has success in deep learning, with many single-task models now performing at or beyond human accuracies for a wide array of tasks. However, an ultimate visual system for full scene understanding should be able to perform many diverse perceptual tasks simultaneously and efficiently, especially within the limited compute environments of embedded systems such as smartphones, wearable devices (e.g., the wearable display system 900 described with reference to FIG. 9), and robots or drones. Such a system can be enabled by multitask learning, where one model shares weights across multiple tasks and makes multiple inferences in one forward pass. Such networks are not only scalable, but the shared features within these networks can induce more robust regularization and boost performance as a result. Multitask networks trained using the methods disclosed herein can be more efficiency and have higher performance.

Multitask networks can difficult to train: different tasks need to be properly balanced so network parameters converge to robust shared features that are useful across all tasks. In some methods, methods in multitask learning can find this balance by manipulating the forward pass of the network (e.g., through constructing explicit statistical relationships between features or optimizing multitask network architectures. However, task imbalances may impede proper training because they manifest as imbalances between backpropagated gradients. A task that is too dominant during training, for example, can express that dominance by inducing gradients which have relatively large magnitudes. The training methods disclosed herein mitigate such issues at their root by directly modifying gradient magnitudes through tuning of the multitask loss function.

In some embodiments, the multitask loss function is a weighted linear combination of the single task losses $L_i$, $L=\Sigma_i w_i L_i$, where the sum runs over all T tasks. An adaptive method is disclosed herein to vary $w_i$ at one or more training steps or iterations (e.g., each training step $t:w_i=w_i(t)$). This linear form of the loss function can be convenient for implementing gradient balancing, as $w_i$ directly and linearly couples to the backpropagated gradient magnitudes from each task. The gradient normalization methods disclosed herein can find a good value (e.g., the best value) for each $w_i$ at each training step t that balances the contribution of each task for improved (e.g., optimal) model training. To improve (e.g., optimize) the weights with $w_i(t)$ for gradient balancing, the methods disclosed herein can penalize the network when backpropagated gradients from any task are too large or too small. The correct balance can be struck when tasks are training at similar rates. For example, if task i is training relatively quickly, then its weight with $w_i(t)$ should decrease relative to other task weights $w_j(t)|_{j \neq i}$ to allow other tasks more influence on training. In some embodiments, batch normalization can be implemented in training. The gradient normalization methods can normalize across tasks and use rate balancing as a desired objective to inform normalization. Such gradient normalization (referred to herein as GradNorm) can boost network performance while significantly curtailing overfitting.

In some embodiments, a GradNorm method can be efficient for multitask loss balancing which directly tunes gradient magnitudes. The method can match or surpasses the performance of very expensive exhaustive grid search procedures, but which only includes tuning a single hyperparameter in some implementations or two or more hyperparameters in some embodiments. GradNorm can enable direct gradient interaction, which can be a powerful way of controlling multitask learning.

In some embodiments, the gradient normalization methods disclosed herein can have applications in computer vision, natural language processing, speech synthesis, domain-specific applications such as traffic prediction, general cross-domain applications, curriculum learning. In some implementations, tasks are jointly trained based on global rewards such as total loss decrease. Embodiments of GradNorm can be applied to train multitask neural networks used for augmented, mixed, or virtual reality (see, e.g., the augmented reality system described with reference to FIG. 9).

Multitask learning can be well suited to the field of computer vision, where making multiple robust predictions can crucial for complete scene understanding. Deep networks have been used to solve various subsets of multiple vision tasks, from 3-task networks, to much larger subsets as in UberNet. Single computer vision problems can be framed as multitask problems, such as in Mask R-CNN for instance segmentation or YOLO-9000 for object detection. Clustering methods have shown success beyond deep models, while constructs such as deep relationship networks and cross-stich networks give deep networks the capacity to search for meaningful relationships between tasks and to learn which features to share between them. Groupings amongst labels can be used to search through possible architectures for learning. A joint likelihood formulation can be used to derive task weights based on the intrinsic uncertainty in each task.

Example GradNorm Method

For a multitask loss function $L(t)=\Sigma w_i(t)L_i(t)$, the functions $w_i(t)$ can be learned with the following objectives: (1) to place gradient norms for different tasks on a common scale through which to reason about their relative magnitudes, and (2) to dynamically adjust gradient norms so different tasks train at similar rates. The relevant quantities are described below, first with respect to the gradients being manipulating.

W: The subset of the full network weights $W \subset \mathcal{W}$ where GradNorm is applied. W can be the last shared layer of weights to save on compute costs. In some embodiments, this choice of W can cause GradNorm to increase training time (e.g., by only ~5%).

$G_W^{(i)}(t)=\|\nabla_W w_i(t)L_i(t)\|_2$: the $L_2$ norm of the gradient of the weighted single-task loss $w_i(t)L_i(t)$ with respect to the chosen weights W.

$\overline{G}_W(t)=E_{task}[G_W^i(t)]$: the average (or expected) gradient norm across all tasks at training time t.

Various training rates for each task i are described below.

$\tilde{L}_i=L_i(t)/L_i(0)$: the loss ratio for task i at time t. $\tilde{L}_i(t)$ is a measure of the inverse training rate of task i (e.g., lower values of $\tilde{L}_i(t)$ correspond to a faster training rate for task i). In some embodiments, networks can have stable initializations and $L_i(0)$ can be used directly. When $L_i(0)$ is sharply dependent on initialization, a theoretical initial loss can be used instead. For example, for $L_i$ the CE loss across C classes, $L_i(0)=\log(c)$.

$r_i(t)=\tilde{L}_i(t)/E_{task}[\tilde{L}_i(t)]$: the relative inverse training rate of task i.

Examples of Balancing Gradients with GradNorm

GradNorm can establish a common scale for gradient magnitudes and/or can balance training rates of different tasks. In one example, the common scale for gradients can be the average gradient norm, $\overline{G}_W(t)$, which establishes a baseline at each timestep t by which relative gradient sizes can be determined. The relative inverse training rate of task i, $r_i(t)$, can be used to rate balance the gradients. Concretely, the higher the value of $r_i(t)$, the higher the gradient magnitudes can be for task i in order to encourage the task to train more quickly. Therefore, the gradient norm for each task i can be:

$$G_W^i(t) \mapsto \overline{G}_W(t) \times [r_i(t)]^\alpha, \qquad \text{Eq. (1)}$$

where $\alpha$ is a hyperparameter. The hyperparameter $\alpha$ sets the strength of the restoring force which pulls tasks back to a common training rate. In cases where tasks are very different in their complexity, leading to dramatically different learning dynamics between tasks, a higher value of $\alpha$ can be used to enforce stronger training rate balancing. When tasks are more symmetric, a lower value of $\alpha$ may be appropriate. Note that $\alpha=0$ tries to pin the norms of backpropagated gradients from each task to be equal at W. The hyperparameter a can be a constant during training (see FIG. 7A for an example) or can vary during training (e.g., $\alpha$ can be a function of training time t). For example, a can start out as a positive value (e.g., about 1.5, which can be an effective value as described with reference to FIG. 6) and be decreased (gradually (see FIG. 7B for an example) or in a step-wise fashion (see FIG. 7C for an example)) as the training proceeds. This approach may advantageously provide stronger training rate balancing at the beginning of the training (e.g., to more quickly train each of the tasks) while relaxing the training rate balancing later in the training. In some cases, a can be negative (e.g., for at least a portion of the training), for example, a variable $\alpha$ can start at a positive value and change during training to a relatively small negative value (e.g., about −0.1) toward the end of training (see FIG. 7D for an example). Thus, in various implementations, the hyperparameter $\alpha$ can be in a range from −1 to 5, −1 to 3, 0.5 to 3, or other suitable range.

Figure 1B:
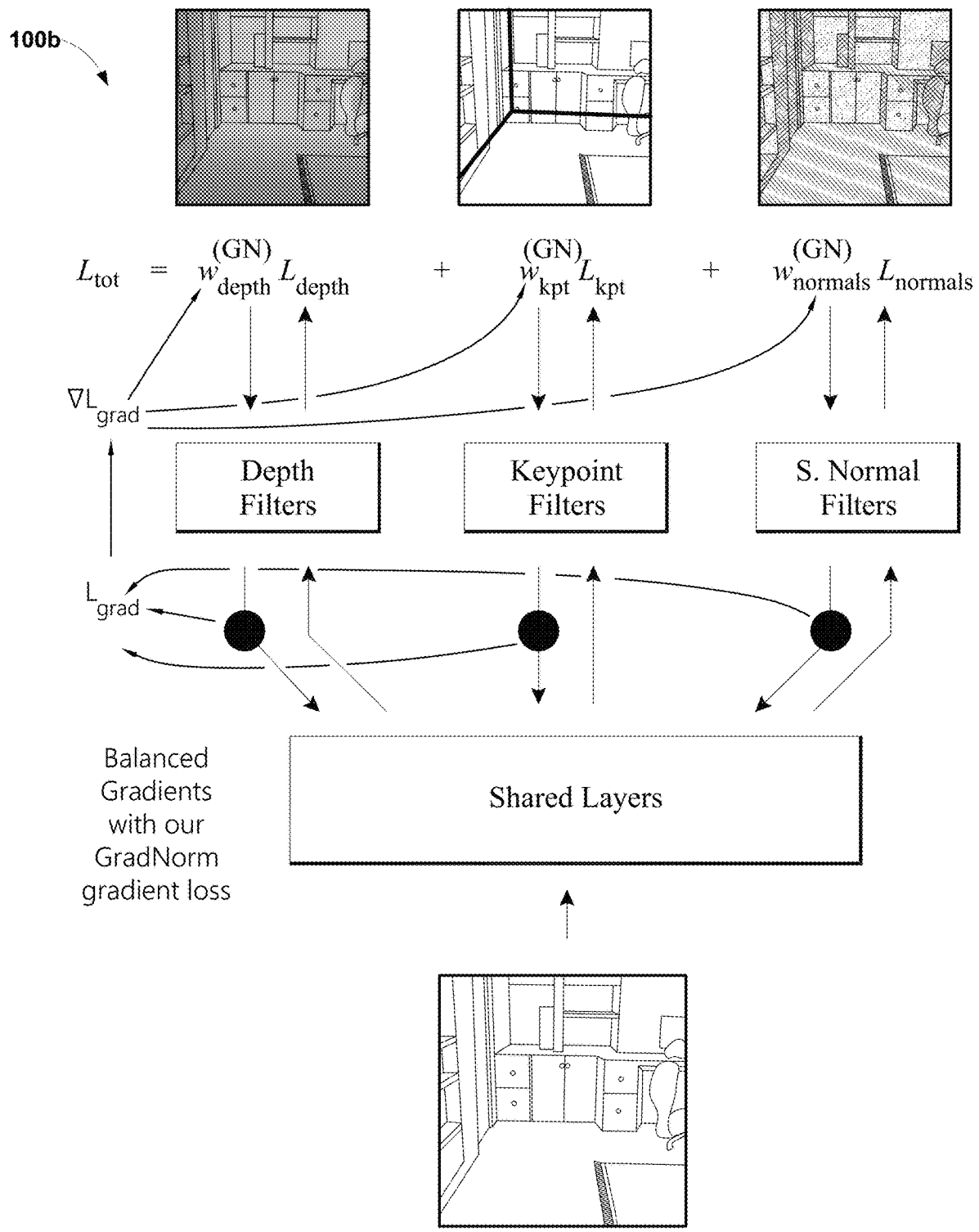
FIG. 1B is an example schematic illustration of balanced gradient norms across task when training a multitask network.

Equation 1 gives a target for each task is gradient norms, and loss weights with $w_i(t)$ can be updated to move gradient norms towards this target for each task. In some embodiments, GradNorm can then implemented as an $L_1$ loss function $L_{grad}$ between the actual and target gradient norms at each time step for each task, summed over all tasks:

$$L_{grad}(t; w_i(t)) = \Sigma_i |G_W^{(i)}(t) - \overline{G}_W(t) \times [r_i(t)]^\alpha|_1, \qquad \text{Eq. (2)}$$

where the summation runs through all T tasks. When differentiating this loss $L_{grad}$, the target gradient norm $G_W(t) \times [r_i(t)]^\alpha$ can be treated as a fixed constant to prevent loss weights with $w_i(t)$ from spuriously drifting towards zero. $L_{grad}$ can then be differentiated with respect to the $w_i$, as the with $w_i(t)$ directly controls gradient magnitudes per task. The computed gradients $\nabla_{w_i} L_{grad}$ can then be applied via update rules to update each $w_i$ (e.g., as shown in FIG. 1B).

In the following examples, the tasks were computer vision tasks including identifying depths, surface normals, and keypoints in room images. The following examples are illustrative only and are not intended to be limiting. As shown in FIG. 1A, imbalanced gradient norms across tasks can result in suboptimal training within a multitask network 100a. GradNorm can compute a gradient loss $L_{grad}$ (see, e.g., FIG. 1A) which tunes the loss weights $w_i$ to fix such imbalances in gradient norms when training a multitask network 100b. Such balancing can result in equalized gradient norms. In some embodiments, relatively high or low gradient magnitudes can be used for some tasks for better (e.g., optimal) training.

An embodiment of the GradNorm method is summarized in Table 1. After every update step, the weights with $w_i(t)$ may be renormalized so that $\Sigma_i w_i(t) = T$ in order to decouple gradient normalization from the global learning rate.

TABLE 1

Training with GradNorm

Initialize $w_i(0) = 1 \; \forall i$
Initialize network weights $\mathcal{W}$
Pick value for $\alpha > 0$ and pick the weights W (e.g., the final layer of weights which are shared between tasks)
for t = 0 to max_train_steps do
    Input batch $x_i$ to compute $L_i(t) \; \forall i$ and $L(t) = \Sigma_i w_i(t) L_i(t)$ [forward pass]
    Compute $G_W^{(i)}(t)$ and $r_i(t) \; \forall i$
    Compute $\overline{G}_W(t)$ by averaging the $G_W^{(i)}(t)$
    Compute $L_{grad} = \Sigma_i |G_W^{(i)}(t) - \overline{G}_W(t) \times [r_i(t)]^\alpha|_1$
    Compute GradNorm gradients $\nabla_{w_i} L_{grad}$, keeping targets $\overline{G}_W(t) \times [r_i(t)]^\alpha$ constant
    Compute standard gradients $\nabla_{\mathcal{W}} L(t)$
    Update $w_i(t) \mapsto w_i(t+1)$ using $\nabla_{w_i} L_{grad}$
    Update $\mathcal{W}(t) \mapsto \mathcal{W}(t+1)$ using $\nabla_{\mathcal{W}} L(t)$ [backward pass]
    Renormalize $w_i(t+1)$ so that $\Sigma_i w_i(t+1) = T$
end for

Example Pseudo Code

Table 2 shows an example pseudo code programming language that can be used to perform an embodiment of the gradient normalization technology described herein.

TABLE 2

Sample PyTorch implementation of an embodiment of GradNorm

```
#GradNorm: Gradient Normalization for Adaptive Loss Balancing in Deep Multitask
Networks
#For a multi-headed multitask network, the function below takes as input the model loss
information, the loss weights w_i, and a list of shared features and implements GradNorm
on those shared features. The output is a GradNorm loss that, when minimized, updates the
loss weights w_i to properly balance the training rates of each task.
import torch
from torch.autograd import Variable, grad
def gradnorm_loss(losses, losses_0, weights, common_layer, alpha):
   #Calculates the GradNorm loss given
   #losses:     length T array of current losses L_i(t) for each task
   #losses 0:   length T array of initial losses L_i(0) for each task
   #weights:    length T array of loss weights w_i. Total loss function is
sum(w_iL_i(t))
   #common_layer:   shared features for which GradNorm is calculated
   #alpha: spring constant/asymmetry constant alpha
   #Returns the GradNorm loss, to be backpropagated into the loss weights w_i
   T = len(losses) #T is now the number of tasks
   #First calculate all gradients at common_layer
   gradsNormAtCommonLayer = [ ]
   for i in xrange(T):
      gradsPred  =  grad(weights[i]*losses[i],  common_layer,
grad_outputs=torch.ones(1 ).cuda( ), create graph=True)
      #now flatten gradient tensor and take its norm
   gradsNormAtCommonLayer.append(torch.norm(gradspred.view(gradspred.size(0),-
1)))
   #Take the mean gradient
   meanGradNorm = gradsNormAtCommonlayer.mean( )
   #Now calculate the training rate equalization term
   loss_ratio = losses/losses_0
   rate = loss_ratio/loss_ratio.mean( )
   rate = rate**alpha
   #The target gradient norm is the product of the rate equalization term and the mean
gradient norm
   targetGradNorm = meanGradNorm*rate
   #Next, to ensure that the target gradient norm is not used in gradient computations
   targetGradNorm = Variable(targetGradNorm.data, requires_grad = False).cuda( )
   #Return a sum of an L 1 loss across all tasks.
   return torch.mean([torch.abs(gradsNormAtCommonLayer[i] - targetGradNorm[i])
for i in xrange(T)])
   #Now call .backward( ) on the returned loss to update the loss weights w_i.
```

Example Training for Training Tasks Having Similar Loss Functions and Different Loss Scales To illustrate GradNorm, a common scenario for multitask networks was constructed: training tasks which have similar loss functions but different loss scales. In such situations, $w_i(t)=1$ for all loss weights $w_i(t)$, the network training may be dominated by tasks with larger loss scales that backpropagate larger gradients. GradNorm can overcome this issue.

Consider T regression tasks trained using standard squared loss onto the functions $$f_i(x) = \sigma_i \tanh((B+\epsilon_i)x), \qquad \text{Eq. (3)}$$

where tanh(.) acts element-wise. Inputs are dimension 250 and outputs dimension 100, while B and $\epsilon_i$ are constant matrices with their elements generated from normal distributions $\mathcal{N}(0,10)$ and $\mathcal{N}(0,3.5)$, respectively. Each task therefore shares information in B but also contains task-specific information $\epsilon_i$. The $\sigma_i$ can the key parameters for training: they are fixed scalars which set the scales of the outputs $f_i$. A higher scale for $f_i$ induces a higher expected value of squared loss for that task. Such tasks are harder to learn due to the higher variances in their response values, but they also backpropagate larger gradients. This scenario can lead to suboptimal training dynamics when the higher $\sigma_i$ tasks dominate the training across all tasks.

To train this model, a 4-layer fully-connected ReLU-activated network with 100 neurons per layer as a common trunk was used. A final affine transformation layer produced T final predictions (corresponding to T different tasks). To ensure valid analysis, models initialized to the same random values were used and were fed data generated from the same fixed random seed. The asymmetry $\alpha$ was set low to 0.12, as the output functions $f_i$ are all of the same functional form and thus the asymmetry between tasks was expected to be minimal.

In this example, the task-normalized test-time loss was used to judge test-time performance, which was the sum of the test loss ratios for each task, $\Sigma_i L_i(t)/L_i(0)$. A simple sum of losses may be an inadequate performance metric for multitask networks when different loss scales exist: higher loss scale tasks can factor disproportionately highly in the loss. There may not exist no general single scalar which can give a meaningful measure of multitask performance in all scenarios, but in this example tasks which were statistically identical except for their loss scales $\sigma_i$. There was therefore a clear measure of overall network performance, which was the sum of losses normalized by each task's variance $\sigma_i^2$—equivalent (up to a scaling factor) to the sum of loss ratios.

Figure 2B:
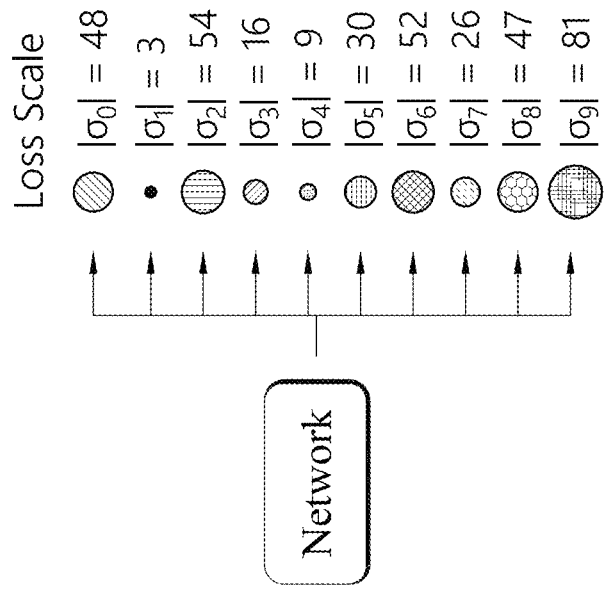
FIGS. 2A-2F show example results for training a multitask network with training tasks having similar loss functions and different loss scales.
Figure 2A:
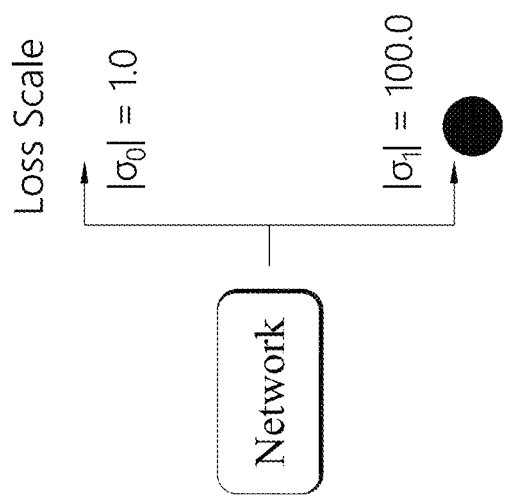
Figure 2C:
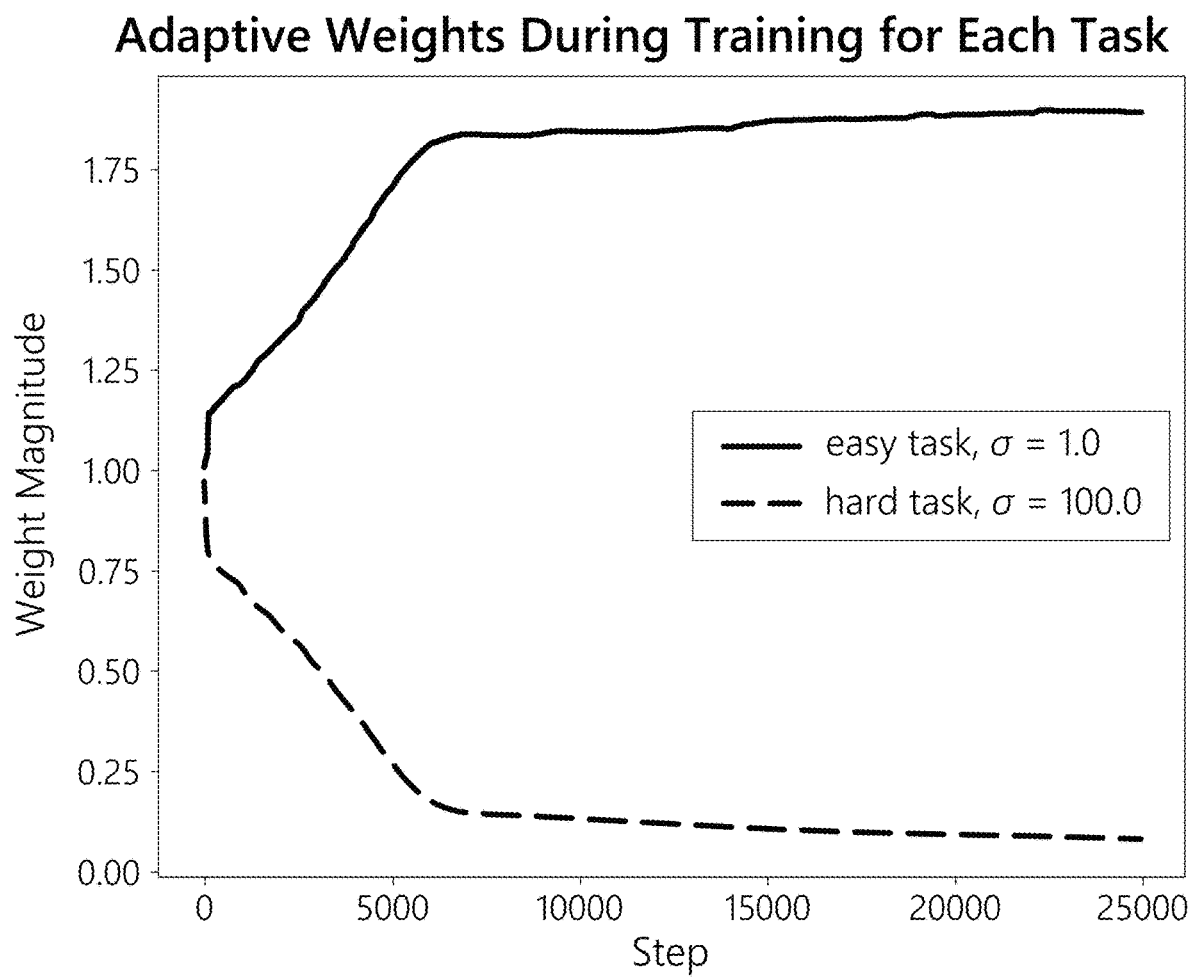

For T=2, values $(\sigma_0, \sigma_1)=(1.0, 100.0)$ was chosen. FIGS. 2A-2C show the result of training. If equal weights $w_i=1$ were used in training, task 1 suppressed task 0 from learning due to task 1's higher loss scale. However, gradient normalization increased $w_0(t)$ to counteract the larger gradients coming from $T_1$, and the improved task balance results in better test-time performance.

Figure 2D:
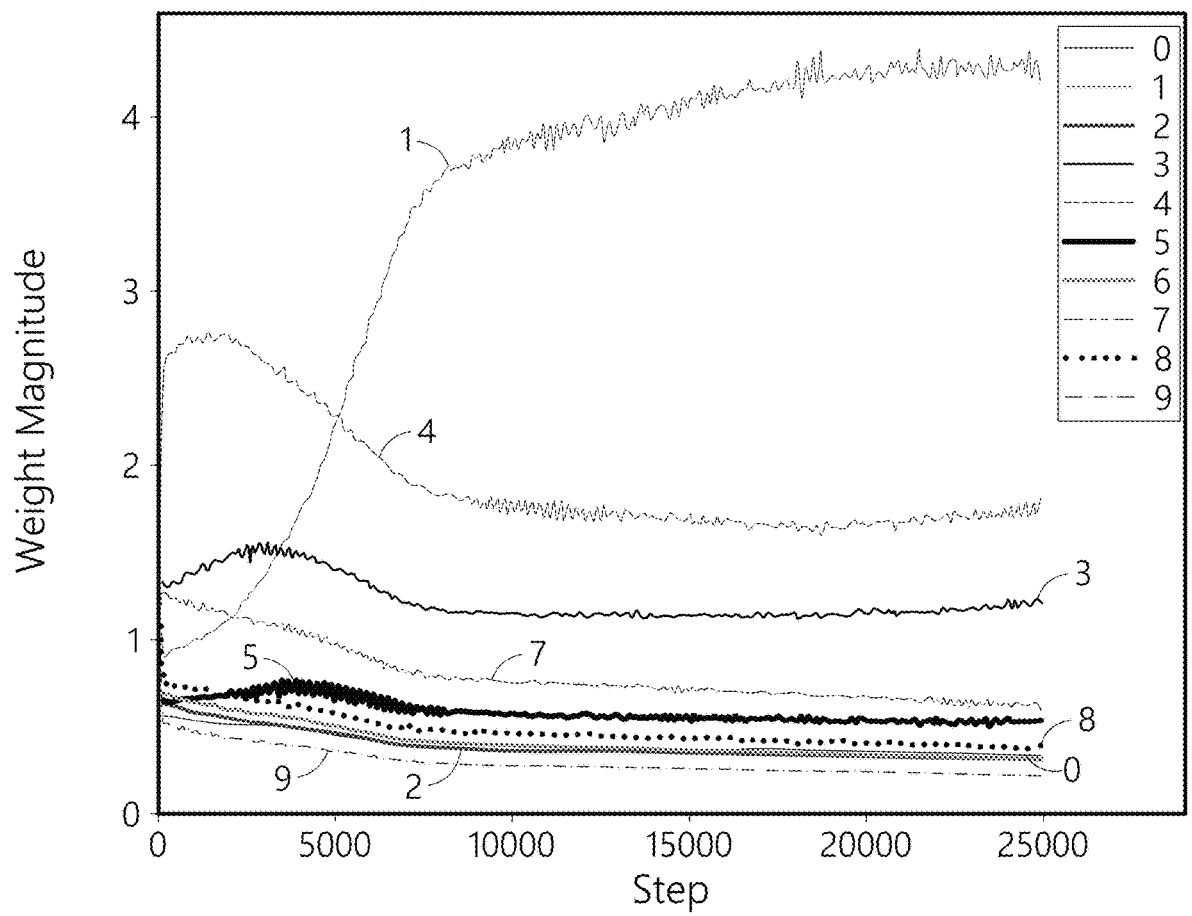
Figure 2E:
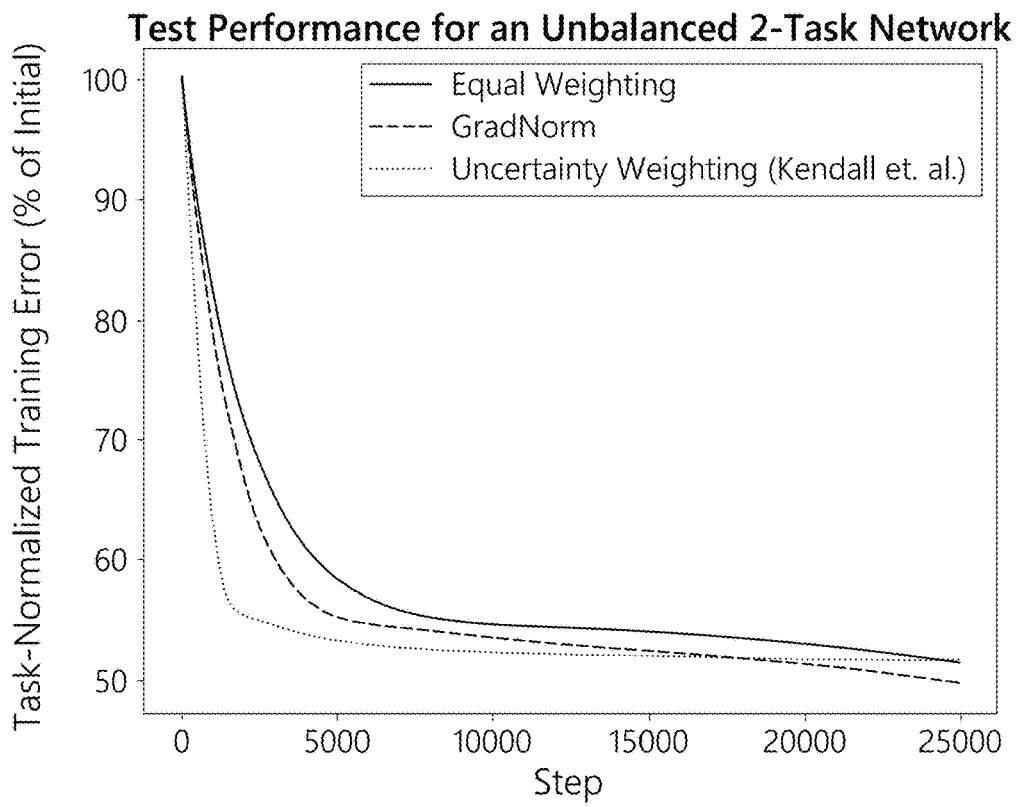
Figure 2F:
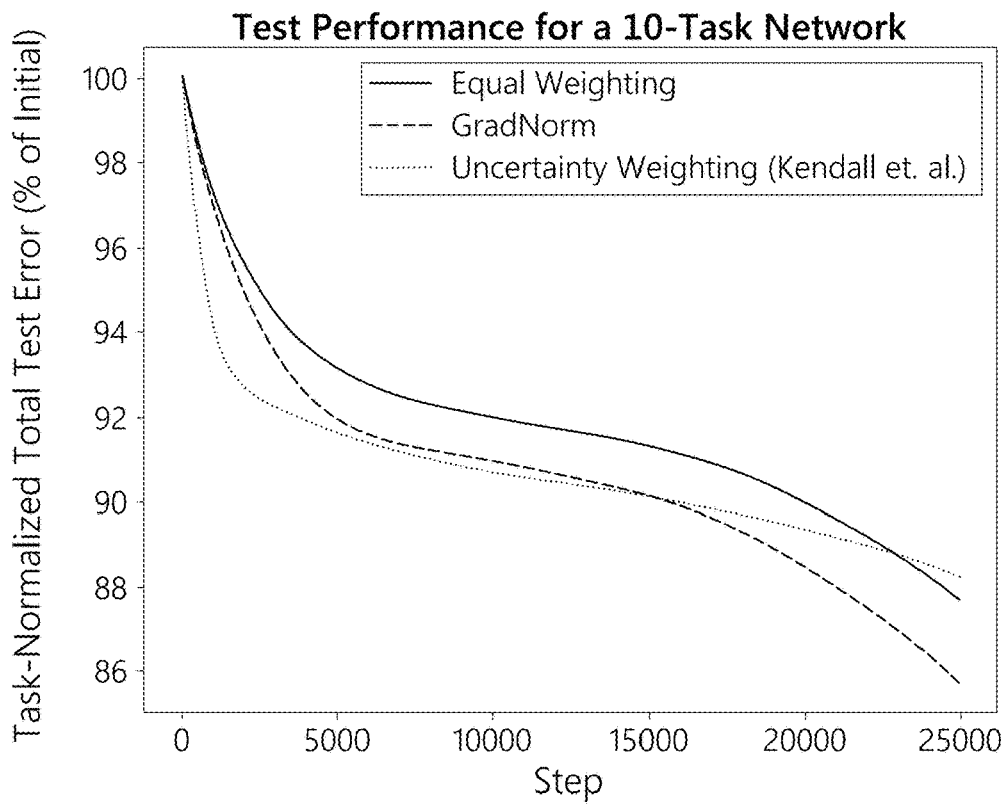

The possible benefits of gradient normalization become even clearer when the number of tasks increases. For T=10, the $\sigma_1$ was sampled from a wide normal distribution and the results are shown FIGS. 2D-2F. GradNorm significantly improved test time performance over naïvely weighting each task the same. Similarly to the T=2 case, for T=10 the $w_i(t)$ grew larger for smaller $\sigma_1$ tasks.

For both T=2 and T=10, GradNorm is more stable and outperforms the uncertainty weighting. Uncertainty weighting, which enforces that $w_i(t) \sim 1/L_i(t)$, tends to grow the weights $w_i(t)$ too large and too quickly as the loss for each task drops. Although such networks train quickly at the onset, the training soon deteriorates. This issue is largely caused by the fact that uncertainty weighting allows $w_i(t)$ to change without constraint (compared to GradNorm which ensures $\Sigma w_i(t)$ always), which pushes the global learning rate up rapidly as the network trains.

The traces for each $w_i(t)$ during a single GradNorm run are observed to be stable and convergent. As shown below, the time-averaged weights $\Sigma_t[w_i(t)]$ lied close to the optimal static weights, suggesting GradNorm can greatly simplify the tedious grid search procedure.

Example Training with a Larger Dataset

Two variants of NYUv2 were used as the main datasets. The standard NYUv2 dataset carries depth, surface normals, and semantic segmentation labels (clustered into 13 distinct classes) for a variety of indoor scenes in different room types (bathrooms, living rooms, studies, etc.). NYUv2 is relatively small (795 training, 654 test images), but contains both regression and classification labels, making it a good choice to test the robustness of GradNorm across various tasks.

The standard NYUv2 depth dataset was augmented with flips and additional frames from each video, resulting in 90,000 images complete with pixel-wise depth, surface normals, and room keypoint labels (segmentation labels were not available for these additional frames). Keypoint labels were annotated by humans, while surface normals were generated algorithmically. The full dataset was then split by scene for a 90/10 train/test split. These two datasets are referred to herein as NYUv2+seg and NYUv2+kpts, respectively.

All inputs were downsampled to 320×320 pixels and outputs to 80×80 pixels. These resolutions enable the models to be kept relatively slim while not compromising semantic complexity in the ground truth output maps. The VGG-style model architecture was derived from U.S. Patent Publication No. 2018/0268220, entitled "Room layout estimation methods and techniques," the content of which is hereby incorporated by reference herein in its entirety.

Model and General Training Characteristics

Two different models were investigated: (1) a SegNet network with a symmetric VGG16 encoder/decoder, and (2) a Fully Convolutional Network (FCN) network with a modified ResNet-50 encoder and shallow ResNet decoder. The VGG SegNet reused maxpool indices to perform upsampling, while the ResNet FCN learned all upsampling filters. The ResNet architecture was further thinned (both in its filters and activations) to contrast with the heavier, more complex VGG SegNet: stride-2 layers were moved earlier and all 2048-filter layers were replaced by 1024-filter layers. Ultimately, the VGG SegNet had 29M parameters versus 15M for the thin ResNet. All model parameters were shared amongst all tasks until the final layer. The results showed GradNorm's robustness to the choice of base architecture. The foregoing example models are for illustration only and are not intended to be limiting. GradNorm can be applied to any other type of neural network including, for example, recurrent neural networks, e.g., as described in U.S. Patent Publication No. 2018/0137642, for "Deep learning system for cuboid detection," the content of which is hereby incorporated by reference herein in its entirety.

Standard pixel-wise loss functions were used for each task: cross entropy for segmentation, squared loss for depth, and cosine similarity for normals. As in U.S. Patent Publication No. 2018/0268220, Gaussian heatmaps were generated for each of 48 room keypoint types and these heatmaps were predicted with a pixel-wise squared loss. All regression tasks were quadratic losses (the surface normal prediction used a cosine loss which is quadratic to leading order), allowing the use of $r_i(t)$ for each task i as a direct proxy for each task's relative inverse training rate.

All runs were trained at a batch size of 24 across 4 Titan X GTX 12 GB GPUs and run at 30 fps on a single GPU at inference. All NYUv2 runs began with a learning rate of 2e-5. NYUv2+kpts runs last 80000 steps with a learning rate decay of 0.2 every 25000 steps. NYUv2+seg runs last 20000 steps with a learning rate decay of 0.2 every 6000 steps. Updating $w_i(t)$ was performed at a learning rate of 0.025 for both GradNorm and the uncertainty weighting baseline. All optimizers were Adam (a method for stochastic optimization derived from adaptive moment estimation to update network weights), although GradNorm was insensitive to the optimizer chosen. GradNorm was implemented using TensorFlow v1.2.1.

TABLE 3

Test error, NYUv2 + seg for GradNorm and various baselines. Lower values are better. Best performance for each task is bolded, with second-best underlined.

| Model Weighting Method | Depth RMS Err. (m) | Seg. Err. (100-IoU) | Normals Err. (1-|cos|) |
|---|---|---|---|
| VGG Backbone | | | |
| Depth Only | 1.038 | — | — |
| Seg. Only | — | 70.0 | — |
| Normals Only | — | — | 0.169 |
| Equal Weights | 0.944 | 70.1 | 0.192 |
| GradNorm Static | <u>0.939</u> | 67.5 | <u>0.171</u> |
| GradNorm $\alpha$ = 1.5 | 0.925 | <u>67.8</u> | 0.174 |

Example Results on NYUv2

Table 3 shows examples of the performance of GradNorm on the NYUv2+seg dataset. GradNorm $\alpha$=1.5 improved the performance of all three tasks with respect to the equal-weights baseline (where $w_i$=1 for all t,i), and either surpassed or matched (within statistical noise) the best performance of single networks for each task. The GradNorm Static network used static weights derived from a GradNorm network by calculating the time-averaged weights $\Sigma_t[w_i(t)]$ for each task during a GradNorm training run, and retraining a network with weights fixed to those values. GradNorm thus can also be used to extract good values for static weights. As showed below, these weights lie very close to the optimal weights extracted from exhaustive grid search.

To show how GradNorm can perform in the presence of a larger dataset, extensive experiments were performed on the NYUv2+kpts dataset, which was augmented to a factor of 50× more data. The results are shown in Table 4. As with the NYUv2+seg runs, GradNorm networks outperformed other multitask methods, and either matched (within noise) or surpassed the performance of single-task networks.

TABLE 4

Test error, NYUv2 + kpts for GradNorm and various baselines. Lower values are better. Best performance for each task is bolded, with second-best underlined.

| Model and Weighting Method | Depth RMS Err. (m) | Kpt. Err. (%) | Normals Err. (1-\|cos\|) |
|---|---|---|---|
| ResNet Backbone | | | |
| Depth Only | 0.725 | — | — |
| Kpt Only | — | 7.90 | — |
| Normals Only | — | — | 0.155 |
| Equal Weights | 0.697 | 7.80 | 0.172 |
| Uncertainty Weighing | 0.702 | 7.96 | 0.182 |
| GradNorm Static | <u>0.695</u> | <u>7.63</u> | <u>0.156</u> |
| GradNorm α = 1.5 | 0.663 | 7.32 | 0.155 |
| VGG Backbone | | | |
| Depth Only | 0.689 | — | — |
| Keypoint Only | — | 8.39 | — |
| Normals Only | — | — | 0.142 |
| Equal Weights | 0.658 | 8.39 | 0.155 |
| Uncertainty Weighting | 0.649 | 8.00 | 0.158 |
| GradNorm Static | <u>0.638</u> | 7.69 | 0.137 |
| GradNorm α = 1.5 | 0.629 | <u>7.73</u> | <u>0.139</u> |

Figure 3A:
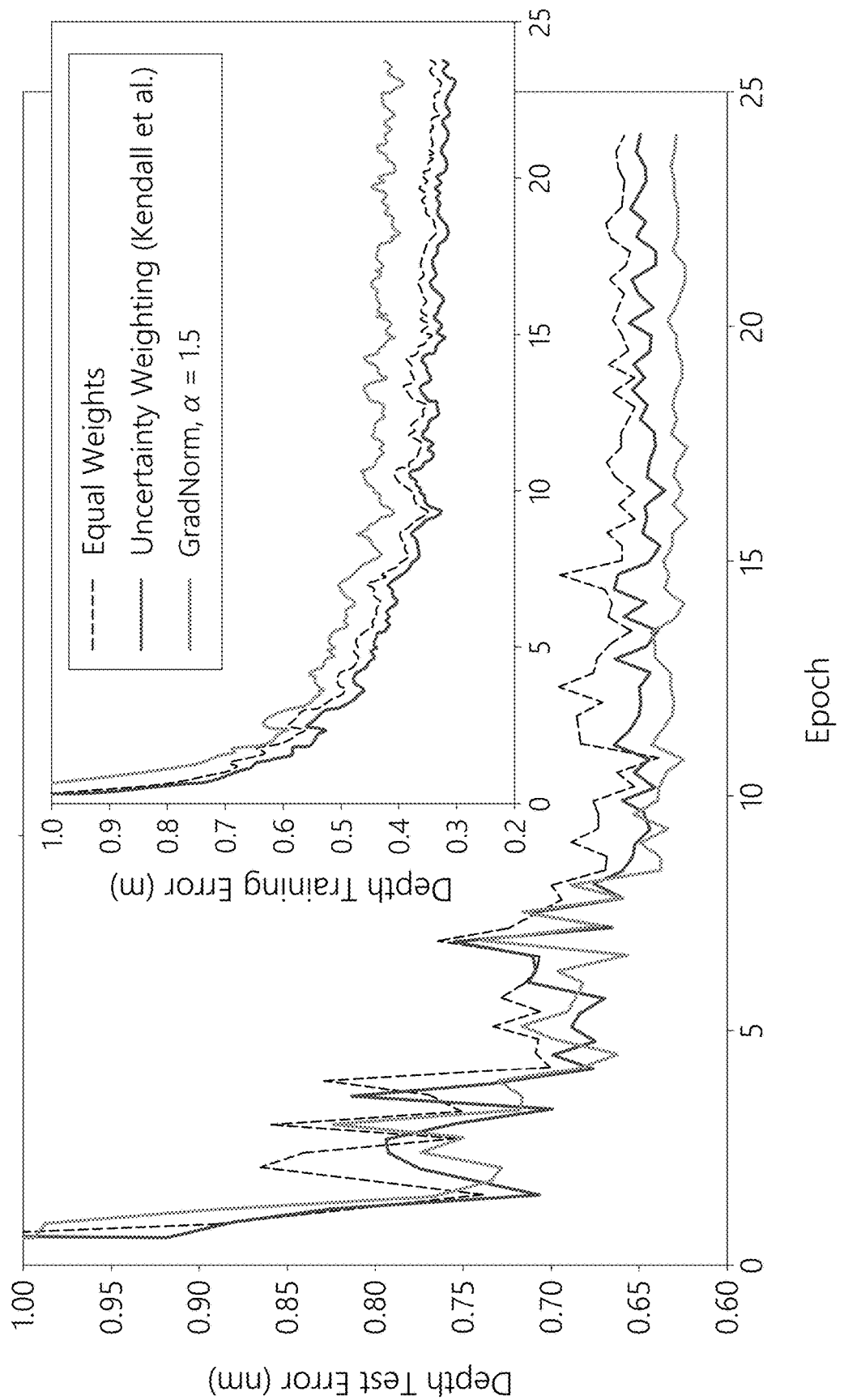
FIGS. 3A-3C are plots of example test and training loss curves for GradNorm (hyperparameter $\alpha=1.5$), an equal weights baseline, and uncertainty weighting on a large dataset. NYUv2+kpts, VGG16 backbone were used.
Figure 3B:
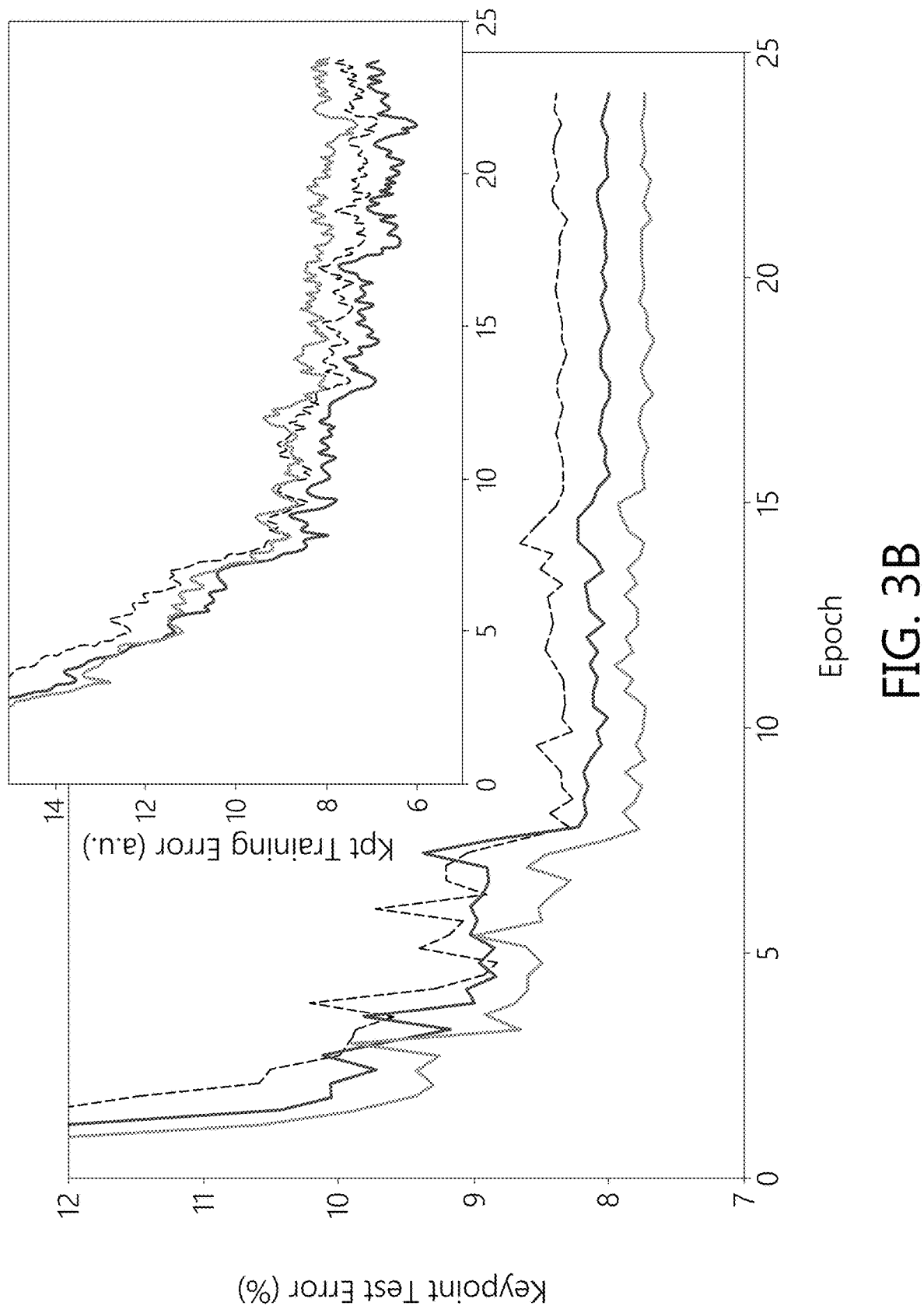
Figure 3C:
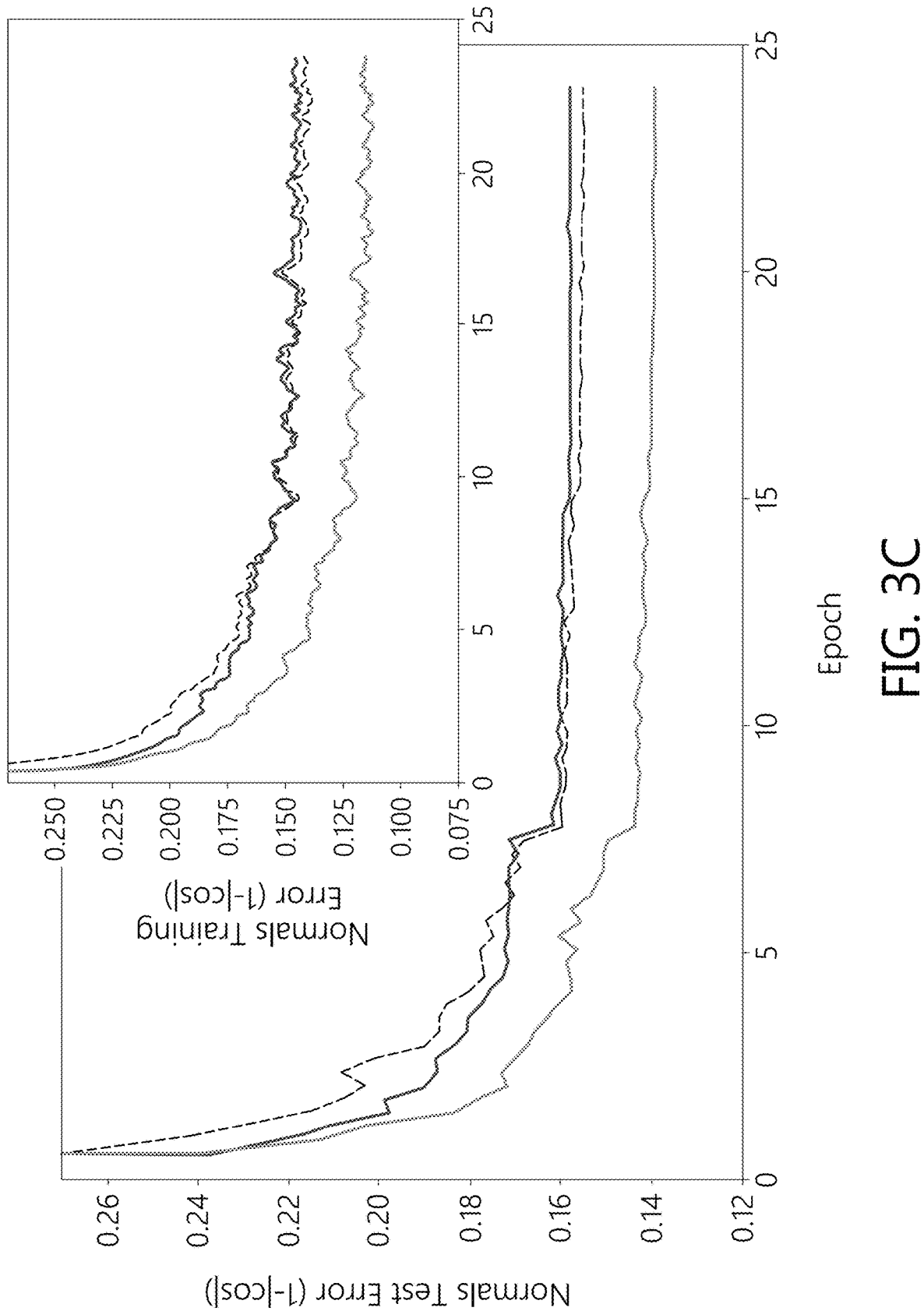

FIGS. 3A-3C show examples of test and training loss curves for GradNorm (α=1.5) and baselines on the larger NYUv2+kpts dataset for the VGG SegNet models. Grad-Norm improved test-time depth error by ~5%, despite converging to a much higher training loss. GradNorm achieved this by aggressively rate balancing the network (enforced by a high asymmetry α=1.5), and ultimately suppressed the depth weight $w_{depth}(t)$ to lower than 0.10. The same trend existed for keypoint regression, and was a clear signal of network regularization. In contrast, uncertainty weighting always moved test and training error in the same direction, and thus was not a good regularizer. Training the thin ResNet FCN also produced similar results.

Gradient Normalization Finds Optimal Grid-Search Weights in One Pass

Figure 4:
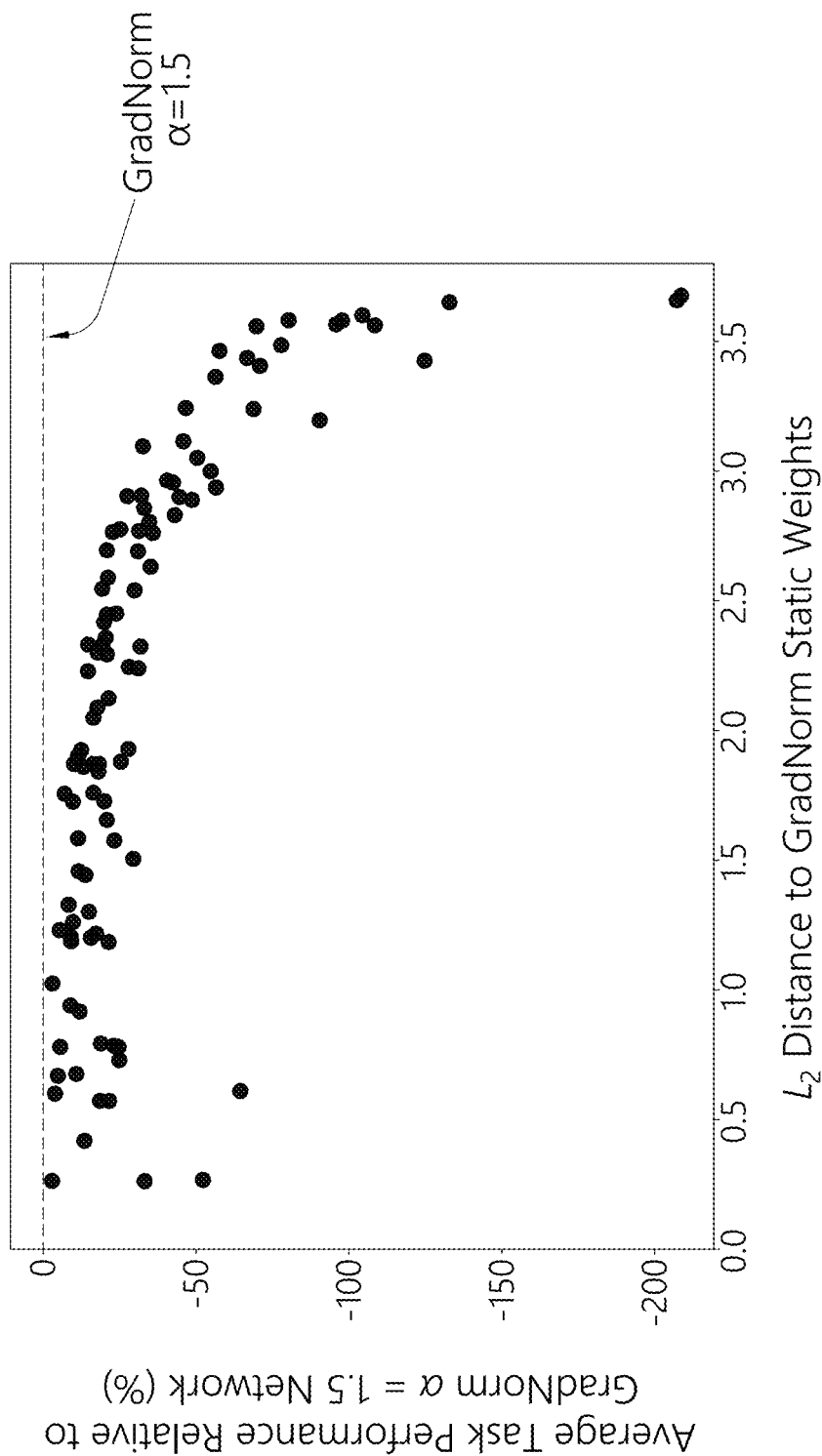
FIG. 4 is a plot showing example grid search performance for random task weights and GradNorm.

For VGG SegNet, 100 networks were trained from scratch with random task weights on NYUv2+kpts. Weights were sampled from a uniform distribution and renormalized to sum to T=3. For computational efficiency, training included 15000 iterations out of the normal 80000, and then the performance of that network was compared to GradNorm α=1.5 VGG SegNet network at the same 15000 steps. The results are shown in FIG. 4. FIG. 4 shows grid search performance for random task weights vs. GradNorm, NYUv2+kpts. Average change in performance across three tasks for a static multitask network with weights $w_i^{static}$ was plotted against the $L_2$ distance between $w_i^{static}$ and a set of static weights derived from a GradNorm network, $E_t[w_i(t)]$. A reference line at zero performance change is shown for reference. All comparisons were made at 15000 steps of training.

Even after 100 networks trained, grid search still fell short of the GradNorm network. There was a strong, negative correlation between network performance and task weight distance to the time-averaged GradNorm weights $E_t[w_i(t)]$. At an $L_2$ distance of ~3, grid search networks on average had almost double the errors per task compared to our Grad-Norm network. GradNorm had therefore found the optimal grid search weights in one single training run.

Effects of Tuning the Asymmetry α

In these example numerical experiments, the only hyper-parameter in the method was the hyperparameter α, which as described herein is also referred to as an asymmetry parameter. The optimal value of a for NYUv2 lied near α=1.5, while in the highly symmetric example in the section above α=0.12 was used. This observation reinforces the characterization of α as an asymmetry parameter.

Figure 5A:
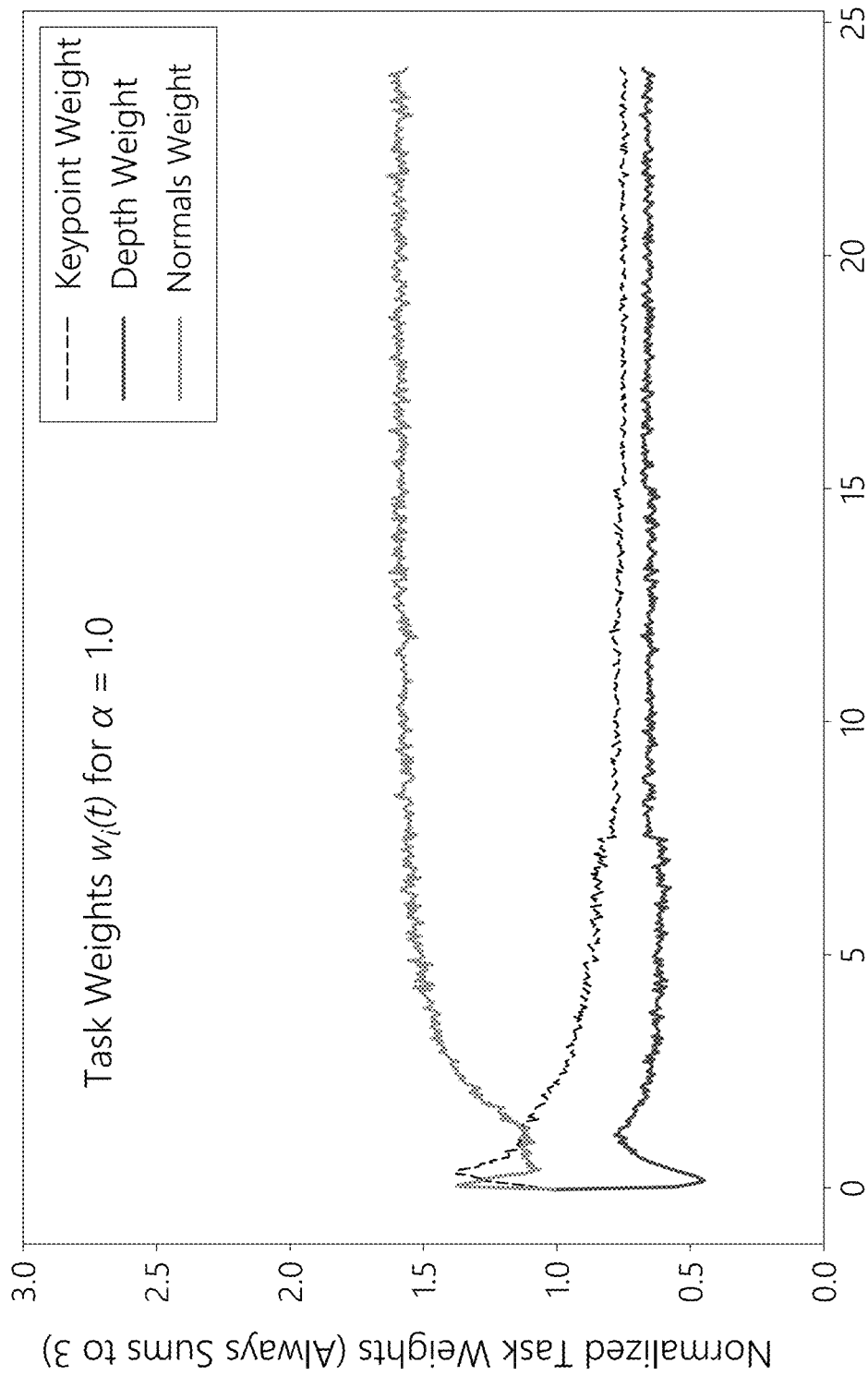
FIGS. 5A-5B are example plots showing that higher values of a tend to push the weights $w_i(t)$ further apart, which more aggressively reduces the influence of tasks which over-fit or learn too quickly.
Figure 5B:
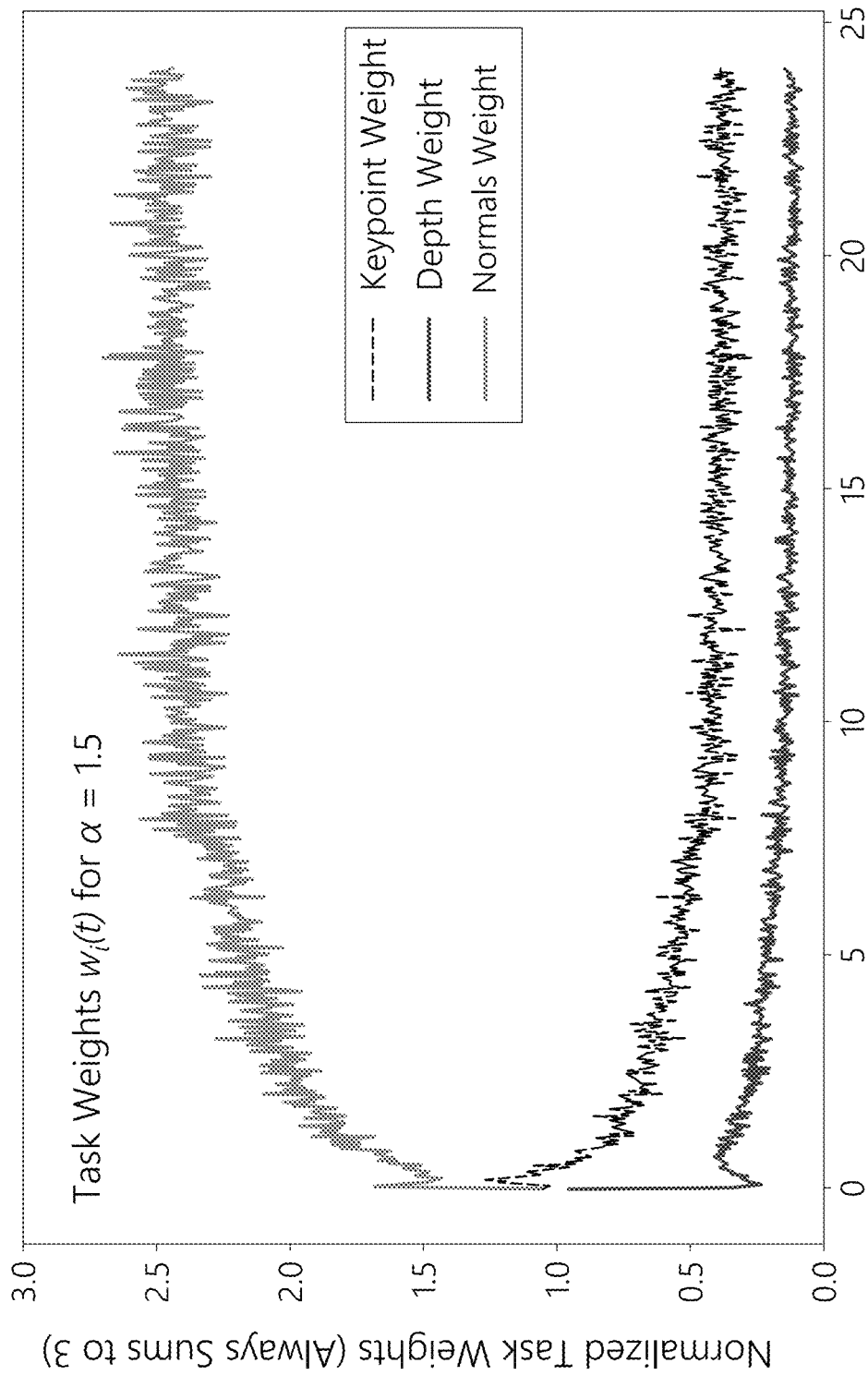

Tuning α lead to performance gains in these examples, but it was found that for NYUv2, almost any value of 0<α<3 improved network performance over an equal weights baseline. FIGS. 5A-5B are plots showing weights with $w_i(t)$ during training, NYUv2+kpts. Traces of how the task weights with $w_i(t)$ changed during training for two different values of α are shown. A larger value of a pushes weights farther apart, leading to less symmetry between tasks. FIGS. 5A-5B show that higher values of α tend to push the weights with $w_i(t)$ further apart, which more aggressively reduced the influence of tasks which over-fit or learn too quickly (in this illustration, depth). At α=1.75 (not shown) $w_{depth}(t)$ was suppressed to below 0.02 at no detriment to network performance on the depth task.

Example Qualitative Results

Figure 6:
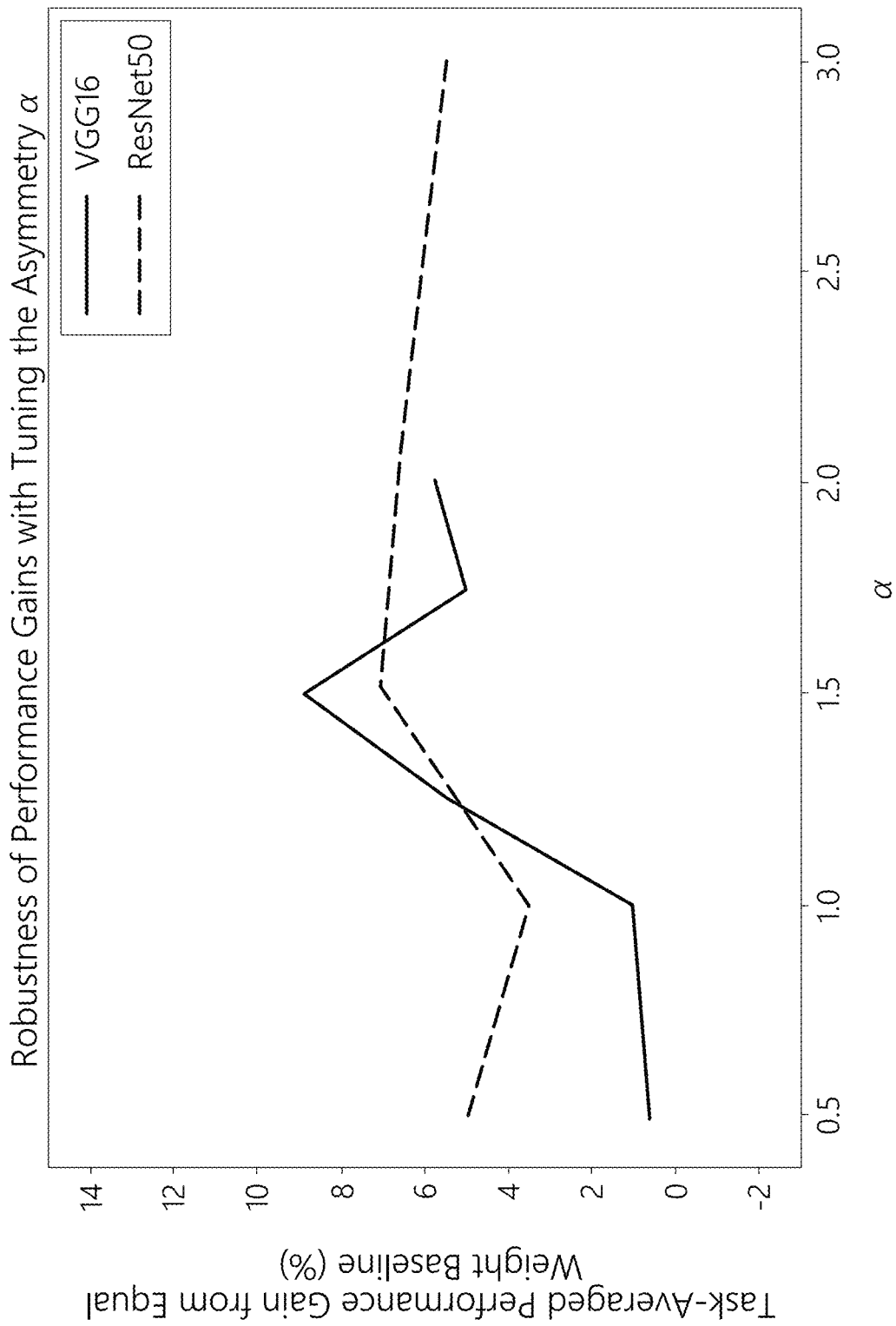
FIG. 6 is an example plot showing performance gains for various settings of the hyperparameter $\alpha$.

Visualizations of the VGG SegNet outputs on test set images along with the ground truth, for both the NYUv2+seg and NYUv2+kpts datasets are shown in FIG. 6 of Chen et al., GradNorm: Gradient Normalization for Adaptive Loss Balancing in Deep Multitask Networks, Proceedings of the 35th International Conference on Machine Learning (2018), 793-802 (hereinafter "Chen et al."); the content of which is hereby incorporated by reference herein in its entirety. Ground truth labels were shown juxtaposed with outputs from the equal weights network, three single networks, and the best GradNorm network. Some improvements were incremental, but GradNorm produced superior visual results in tasks for which there were significant quantitative improvements in Tables 3 and 4.

FIG. 6 of Chen et al. shows example visualizations at inference time. NYUv2+kpts outputs were shown on the left, while NYUv2+seg outputs were shown on the right. Visualizations shown were generated from random test set images. Some improvements were incremental, but red frames are shown around predictions that were visually more clearly improved by GradNorm. For NYUv2+kpts outputs GradNorm showed improvement over the equal weights network in normals prediction and over single networks in keypoint prediction. For NYUv2+seg there was an improvement over single networks in depth and segmentation accuracy. These are consistent with the numbers reported in Tables 3 and 4.

Example Performance Gains Versus α

The α asymmetry hyperparameter can allow accommodation for various different priors on the symmetry between tasks. A low value of α can result in gradient norms which are of similar magnitude across tasks, ensuring that each task has approximately equal impact on the training dynamics throughout training. A high value of α can penalize tasks whose losses drop too quickly, instead placing more weight on tasks whose losses are dropping more slowly.

For the NYUv2 experiments, α=1.5 was chosen as the optimal value for α, and increasing α can push the task weights with $w_i(t)$ farther apart. Overall gains in performance was achieved for almost all positive values of α for which GradNorm was numerically stable. These results are summarized in FIG. 6. At large positive values of, which in the NYUv2 case corresponded to ≥3, some weights were pushed too close to zero and GradNorm updates may became unstable on this example dataset. FIG. 6 shows performance gains on NYUv2+kpts for various settings of α. For various values of α, the average performance gain (defined as the mean of the percent change in the test loss compared to the equal weights baseline across all tasks) was plotted on NYUv2+kpts. Results for both the VGG16 backbone (solid line) and the ResNet50 backbone (dashed line) are shown. Performance gains at all values of α tested were observed, although gains appear to peak around α=1.5. No points past α>2 are shown for the VGG16 backbone as GradNorm weights; however, this is not a limitation on GradNorm.

As shown in FIG. 6, performance gains were achieved at almost all values of α. However, for NYUv2+kpts in particular, these performance gains seemed to be peaked at α=1.5 for both backbone architectures. Moreover, the ResNet architecture seemed more robust to a than the VGG architecture, although both architectures offered a similar level of gains with the proper setting of α. The consistently positive performance gains across all values of a suggest that any kind of gradient balancing (even in suboptimal regimes) can be advantageous for multitask network training.

Example Performance on a Multitask Facial Landmark Dataset

Additional experiments were performed on the Multitask Facial Landmark (MTFL) dataset. This dataset contains approximately 13,000 images of faces, split into a training set of 10,000 images and a test set of 3,000 images. Images are each labeled with (x, y) coordinates of five facial landmarks (left eye, right eye, nose, left lip, and right lip), along with four class labels (gender, smiling, glasses, and pose). Examples labels from the dataset include (gender: male, smiling: true, glasses: false, pose: frontal), (gender: female, smiling: true, glasses: false, pose: left), and (gender: male, smiling: false, glasses: true, pose: left).

The MTFL dataset provides a good opportunity to test GradNorm, as the MTFL dataset is a rich mixture of classification and regression tasks. Experiments were performed at two different image input resolutions: 40×40 and 160×160. For the 40×40 experiments, the same architecture as in used in the MTFL 2014 was used to ensure a fair comparison, while for the 160×160 experiments a deeper version of the architecture in the MTFL 2014 was used: the deeper model layer stack was [CONV-5-16][POOL-2][CONV-3-32]²[POOL-2][CONV-3-64]²[POOL-2][[CONV-3-128][POOL-2]]²[CONV-3-128]²[FC-100][FC-18], where CONV-X-F denotes a convolution with filter size X and F output filters, POOL-2 denotes a 2×2 pooling layer with stride 2, and FC-X is a dense layer with X outputs. All networks output 18 values: 10 coordinates for facial landmarks, and 4 pairs of 2 softmax scores for each classifier.

The results on the MTFL dataset are shown in Table 5. Keypoint error is a mean over $L_2$ distance errors for all five facial landmarks, normalized to the inter-ocular distance, while failure rate is the percent of images for which keypoint error is over 10%. For both resolutions, GradNorm outperformed other methods on all tasks (except for glasses and pose prediction, both of which always quickly converged to the majority classifier and refuse to train further). GradNorm also matched the performance of MTFL 2014 on keypoints, even though the latter did not try to optimize for classifier performance and only stressed keypoint accuracy. Altogether, these results show that GradNorm significantly improved classification accuracy on gender and smiles, while at least matching all other methods on all other tasks.

TABLE 5

Test error on the Multi-Task Facial Landmark (MTFL) dataset for an embodiment of GradNorm and various baselines. Lower values are better and best performance for each task is bolded. Experiments were performed for two different input resolutions, 40 × 40 and 160 × 160. In all cases, GradNorm showed superior performance, especially on gender and smiles classification. GradNorm also matches the performance of MTFL 2014) on keypoint prediction at 40 × 40 resolution, even though the latter only tried to optimize keypoint accuracy (sacrificing classification accuracy in the process).

| Method | Input Resolution | Keypoint Err. (%) | Failure Rate. (%) | Gender Err. (%) | Smiles Err. (%) | Glasses Err. (%) | Pose Err. (%) |
| --- | --- | --- | --- | --- | --- | --- | --- |
| Equal Weights | 40 × 40 | 8.3 | 27.4 | 20.3 | 19.2 | 8.1 | 38.9 |
| MTFL 2014 | 40 × 40 | 8.2 | 25.0 | — | — | — | — |
| MTFL 2017 | 40 × 40 | 8.3 | 27.2 | 20.7 | 18.5 | 8.1 | 38.9 |
| GradNorm α = 0.3 | 40 × 40 | 8.0 | 25.0 | 17.3 | 16.9 | 8.1 | 38.9 |
| Equal Weights | 160 × 160 | 6.8 | 15.2 | 18.6 | 17.4 | 8.1 | 38.9 |
| Uncertainty Weighting | 160 × 160 | 7.2 | 18.3 | 38.1 | 18.4 | 8.1 | 38.9 |
| GradNorm α = 0.2 | 160 × 160 | 6.5 | 14.3 | 14.4 | 15.4 | 8.1 | 38.9 |

Both glasses and pose classification always converged to the majority classifier. Such tasks which become "stuck" during training may be overcome for GradNorm in some embodiments, by not continuously increasing the loss weights for these tasks. GradNorm may alleviate this issue by, for example, detecting pathological tasks online and removing them from the GradNorm update equation.

GradNorm still provided superior performance on this dataset. All loss weights were initialized to $w_i(0)=1$. Uncertainty weighting tended to increase the loss weight for keypoints relative to that of the classifier losses, while GradNorm aggressively decreased the relative keypoint loss weights. For GradNorm training runs, $w_{kpt}(t)$ converged to a value ≤0.01, showing that even with gradients that were smaller by two orders of magnitude compared to uncertainty weighting or the equal weights method, the keypoint task trained properly with no attenuation of accuracy.

GradNorm could correctly identify that the classification tasks in the MTFL dataset are relatively undertrained and need to be boosted. In contrast, uncertainty weighting made the inverse decision by placing more relative focus on keypoint regression, and often performed quite poorly on classification (especially for higher resolution inputs). These experiments thus highlight GradNorm's ability to identify and benefit tasks which require more attention during training.

Additional Observations Concerning GradNorm

As described herein, gradient normalization can act as a good model regularizer and lead to superb performance in multitask networks by operating directly on the gradients in the network. GradNorm can be driven by the attractively simple heuristic of rate balancing, and can accommodate problems of varying complexities within the same unified model and in some embodiments uses only a single hyperparameter representing task asymmetry. A GradNorm network can also be used to quickly extract optimal fixed task weights, removing the need for exhaustive grid search methods that become exponentially more expensive with the number of tasks.

Embodiments of GradNorm can provide an efficient method for tuning loss weights in a multi-task learning setting based on balancing the training rates of different tasks. For both synthetic and real datasets, GradNorm improved multitask test-time performance in a variety of scenarios, and can accommodate various levels of asymmetry amongst the different tasks through the hyperparameter $\alpha$. The results indicate that GradNorm offers superior performance over other multitask adaptive weighting methods and can match or surpass the performance of exhaustive grid search while being significantly less time-intensive.

In some embodiments, GradNorm may have applications beyond multitask learning. GradNorm can be applied to class-balancing and sequence-to-sequence models, all situations where problems with conflicting gradient signals can degrade model performance. Embodiments of GradNorm may not only provide a robust new method for multitask learning, but also show that that gradient tuning can be advantageously used for training large, effective models on complex tasks.

Example Process of Training a Multitask Network

Figure 8:
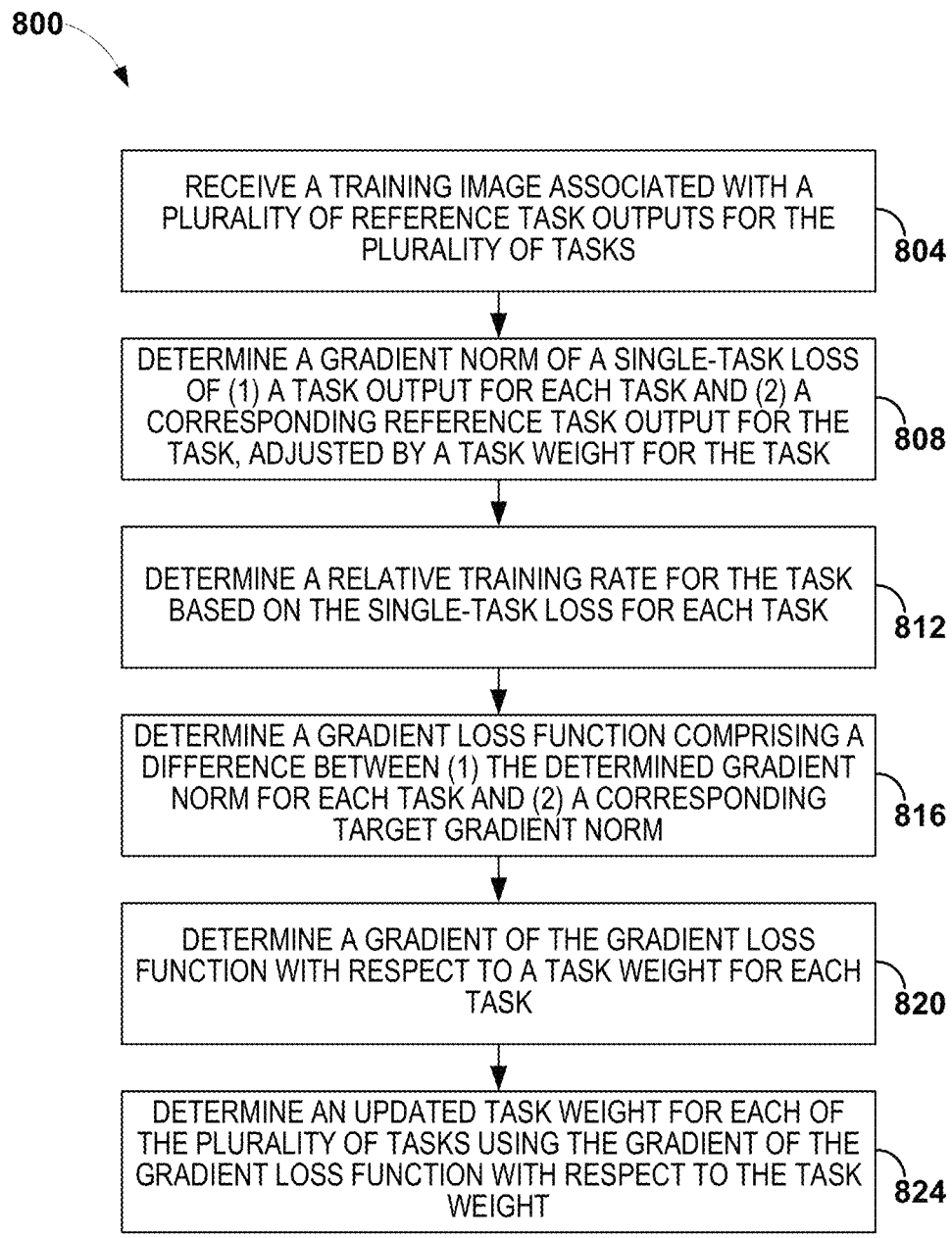
FIG. 8 is a flow diagram of an example process of training a multitask network using GradNorm.

FIG. 8 is a flow diagram of an example process 800 of training a multitask network. The multitask network can be used for determining outputs associated with a plurality of tasks. The multitask network can comprise a plurality of shared layers and an output layer comprising a plurality of task specific filters. The output layer of the multitask network can comprise an affine transformation layer. A computing system, such as a computing system with non-transitory memory and a hardware processor, can implement the process 800 to train a multitask network. The non-transitory memory of the computing system can store, or be configured to store, executable instructions. The hardware processor can be in communication with the non-transitory memory and programmed by the executable instructions to perform the process 800 to train a multitask network using an embodiment of GradNorm.

The process 800 starts at block 804, where a computing system receives a training image associated with a plurality of reference task outputs for the plurality of tasks. The plurality of tasks can comprise a regression task, a classification task, or a combination thereof. The plurality of tasks can comprise, for example, a perception task, such as the face recognition, visual search, gesture identification or recognition, semantic segmentation, object detection, room layout estimation, cuboid detection, lighting detection, simultaneous localization and mapping, relocalization of an object or an avatar, or speech processing tasks such as speech recognition or natural language processing, or a combination thereof.

At block 808, the computing system can determine a gradient norm, $G_W^{(i)}(t)$, of a single-task loss $L_i(t)$ of (1) a task output for each task and (2) a corresponding reference task output for the task, adjusted by a task weight for the task. The gradient norm can be determined with respect to a plurality of network weights of the multitask network. The corresponding reference task output for the task can be associated with the training image. The gradient norm of the single-task loss adjusted by the task weight can be a $L_2$ norm of the single-task loss adjusted by the task weight.

The computing system can determine the single-task loss of (1) the task output for each task determined using the multitask network with the training image as input, and (2) the corresponding task output for the task associated with the training image. To determine the single-task loss, the computing system can: determine the single-task loss of (1) the task output for each task determined using the multitask network with the training image as input, and (2) the corresponding task output for the task associated with the training image, using a loss function of a plurality of loss functions associated with the task. The computing system can determine an average, $\overline{G}_W(t)$, of the gradient norms of the plurality of tasks as the average gradient norm.

At block 812, the computing system can determine a relative training rate, for the task based on the single-task loss for the task. To determine the relative training rate for the task based on the single-task loss for the task, the computing system can determine the inverse of the relative training rate for the task, $r_i(t)$, based on a loss ratio of the single-task loss for the task, $L_i(t)$, and another single-task loss for the task, such as $L_i(0)$. To determine the inverse of the relative rate for the task, the computing system can determine a ratio of the loss ratio of the task and an average of loss ratios of the plurality of tasks as the inverse of the relative training rate.

At block 816, the computing system can determine a gradient loss function $L_{grad}$ comprising a difference between (1) the determined gradient norm for each task, $G_W^{(i)}(t)$, and (2) a corresponding target gradient norm. The corresponding target gradient norm can be determined based on (a) an average gradient norm of the plurality of tasks, (b) the relative training rate for the task, and (c) a hyperparameter $\alpha$, such as $\overline{G}_W(t) \times [r_i(t)]^\alpha$. The gradient loss function can be a $L_1$ loss function. The corresponding target gradient norm can be determined based on (a) an average gradient norm of the plurality of tasks, (b) an inverse of the relative training rate for the task, and (c) a hyperparameter. The determine the average gradient norm of the plurality of tasks multiplied by the inverse relative training rate for the task to the power of the hyperparameter as the corresponding target gradient norm. The hyperparameter $\alpha$ can be constant during training (see FIG. 7A for an illustration) or can vary (see FIGS. 7B-7D for illustrations) during training. As described herein, the hyperparameter $\alpha$ can be in a range from −1 to 3, 0.5 to 3, or some other range in various embodiments.

At block 820, the computing system can determine a gradient of the gradient loss function, $\nabla_{W_i} L_{grad}$, with respect to a task weight for each task of the plurality of tasks. To determine the gradient of the gradient loss function, the computing system can determine the gradient of the gradient loss function with respect to the task weight for each task of the plurality of tasks while keeping the target gradient norm for the task constant.

At block 824, the computing system can determine an updated task weight $w_i(t+1)$ for each of the plurality of tasks using the gradient of the gradient loss function, $\nabla_{W_i} L_{grad}$, with respect to the task weight. The computing system can normalize the updated weights for the plurality of tasks. To normalize the updated weights for the plurality of tasks, the computing system can normalize the updated weights for the plurality of tasks to a number of the plurality of tasks.

The computing system can determine a multitask loss function comprising the single-task loss adjusted by the task weight for each task, determine a gradient of the multitask loss function with respect to all network weights of the multitask network, and determine updated network weights of the multitask network based on the gradient of the multitask loss function.

Example NN Layers

A layer of a neural network (NN), such as a deep neural network (DNN) can apply a linear or non-linear transformation to its input to generate its output. A deep neural network layer can be a normalization layer, a convolutional layer, a softsign layer, a rectified linear layer, a concatenation layer, a pooling layer, a recurrent layer, an inception-like layer, or any combination thereof. The normalization layer can normalize the brightness of its input to generate its output with, for example, L2 normalization. The normalization layer can, for example, normalize the brightness of a plurality of images with respect to one another at once to generate a plurality of normalized images as its output. Non-limiting examples of methods for normalizing brightness include local contrast normalization (LCN) or local response normalization (LRN). Local contrast normalization can normalize the contrast of an image non-linearly by normalizing local regions of the image on a per pixel basis to have a mean of zero and a variance of one (or other values of mean and variance). Local response normalization can normalize an image over local input regions to have a mean of zero and a variance of one (or other values of mean and variance). The normalization layer may speed up the training process.

The convolutional layer can apply a set of kernels that convolve its input to generate its output. The softsign layer can apply a softsign function to its input. The softsign function (softsign(x)) can be, for example, (x/(1+|x|)). The softsign layer may neglect impact of per-element outliers. The rectified linear layer can be a rectified linear layer unit (ReLU) or a parameterized rectified linear layer unit (PReLU). The ReLU layer can apply a ReLU function to its input to generate its output. The ReLU function ReLU(x) can be, for example, max(0, x). The PReLU layer can apply a PReLU function to its input to generate its output. The PReLU function PReLU(x) can be, for example, x if x≥0 and ax if x<0, where α is a positive number. The concatenation layer can concatenate its input to generate its output. For example, the concatenation layer can concatenate four 5×5 images to generate one 20×20 image. The pooling layer can apply a pooling function which down samples its input to generate its output. For example, the pooling layer can down sample a 20×20 image into a 10×10 image. Non-limiting examples of the pooling function include maximum pooling, average pooling, or minimum pooling.

At a time point t, the recurrent layer can compute a hidden state s(t), and a recurrent connection can provide the hidden state s(t) at time t to the recurrent layer as an input at a subsequent time point t+1. The recurrent layer can compute its output at time t+1 based on the hidden state s(t) at time t. For example, the recurrent layer can apply the softsign function to the hidden state s(t) at time t to compute its output at time t+1. The hidden state of the recurrent layer at time t+1 has as its input the hidden state s(t) of the recurrent layer at time t. The recurrent layer can compute the hidden state s(t+1) by applying, for example, a ReLU function to its input. The inception-like layer can include one or more of the normalization layer, the convolutional layer, the softsign layer, the rectified linear layer such as the ReLU layer and the PReLU layer, the concatenation layer, the pooling layer, or any combination thereof.

The number of layers in the NN can be different in different implementations. For example, the number of layers in the DNN can be 50, 100, 200, or more. The input type of a deep neural network layer can be different in different implementations. For example, a layer can receive the outputs of a number of layers as its input. The input of a layer can include the outputs of five layers. As another example, the input of a layer can include 1% of the layers of the NN. The output of a layer can be the inputs of a number of layers. For example, the output of a layer can be used as the inputs of five layers. As another example, the output of a layer can be used as the inputs of 1% of the layers of the NN.

The input size or the output size of a layer can be quite large. The input size or the output size of a layer can be n×m, where n denotes the width and m denotes the height of the input or the output. For example, n or m can be 11, 21, 31, or more. The channel sizes of the input or the output of a layer can be different in different implementations. For example, the channel size of the input or the output of a layer can be 4, 16, 32, 64, 128, or more. The kernel size of a layer can be different in different implementations. For example, the kernel size can be n×m, where n denotes the width and m denotes the height of the kernel. For example, n or m can be 5, 7, 9, or more. The stride size of a layer can be different in different implementations. For example, the stride size of a deep neural network layer can be 3, 5, 7 or more.

In some embodiments, a NN can refer to a plurality of NNs that together compute an output of the NN. Different NNs of the plurality of NNs can be trained for different tasks. A processor (e.g., a processor of the local data processing module 924 descried with reference to FIG. 9) can compute outputs of NNs of the plurality of NNs to determine an output of the NN. For example, an output of a NN of the plurality of NNs can include a likelihood score. The processor can determine the output of the NN including the plurality of NNs based on the likelihood scores of the outputs of different NNs of the plurality of NNs.

Example Wearable Display System

In some embodiments, a user device can be, or can be included, in a wearable display device, which may advantageously provide a more immersive virtual reality (VR), augmented reality (AR), or mixed reality (MR) experience, where digitally reproduced images or portions thereof are presented to a wearer in a manner wherein they seem to be, or may be perceived as, real.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. For example, displays containing a stack of waveguides may be configured to be worn positioned in front of the eyes of a user, or viewer. The stack of waveguides may be utilized to provide three-dimensional perception to the eye/brain by using a plurality of waveguides to direct light from an image injection device (e.g., discrete displays or output ends of a multiplexed display which pipe image information via one or more optical fibers) to the viewer's eye at particular angles (and amounts of divergence) corresponding to the depth plane associated with a particular waveguide.

In some embodiments, two stacks of waveguides, one for each eye of a viewer, may be utilized to provide different images to each eye. As one example, an augmented reality scene may be such that a wearer of an AR technology sees a real-world park-like setting featuring people, trees, buildings in the background, and a concrete platform. In addition to these items, the wearer of the AR technology may also perceive that he "sees" a robot statue standing upon the real-world platform, and a cartoon-like avatar character flying by which seems to be a personification of a bumble bee, even though the robot statue and the bumble bee do not exist in the real world. The stack(s) of waveguides may be used to generate a light field corresponding to an input image and in some implementations, the wearable display comprises a wearable light field display. Examples of wearable display device and waveguide stacks for providing light field images are described in U.S. Patent Publication No. 2015/0016777, which is hereby incorporated by reference herein in its entirety for all it contains.

Figure 9:
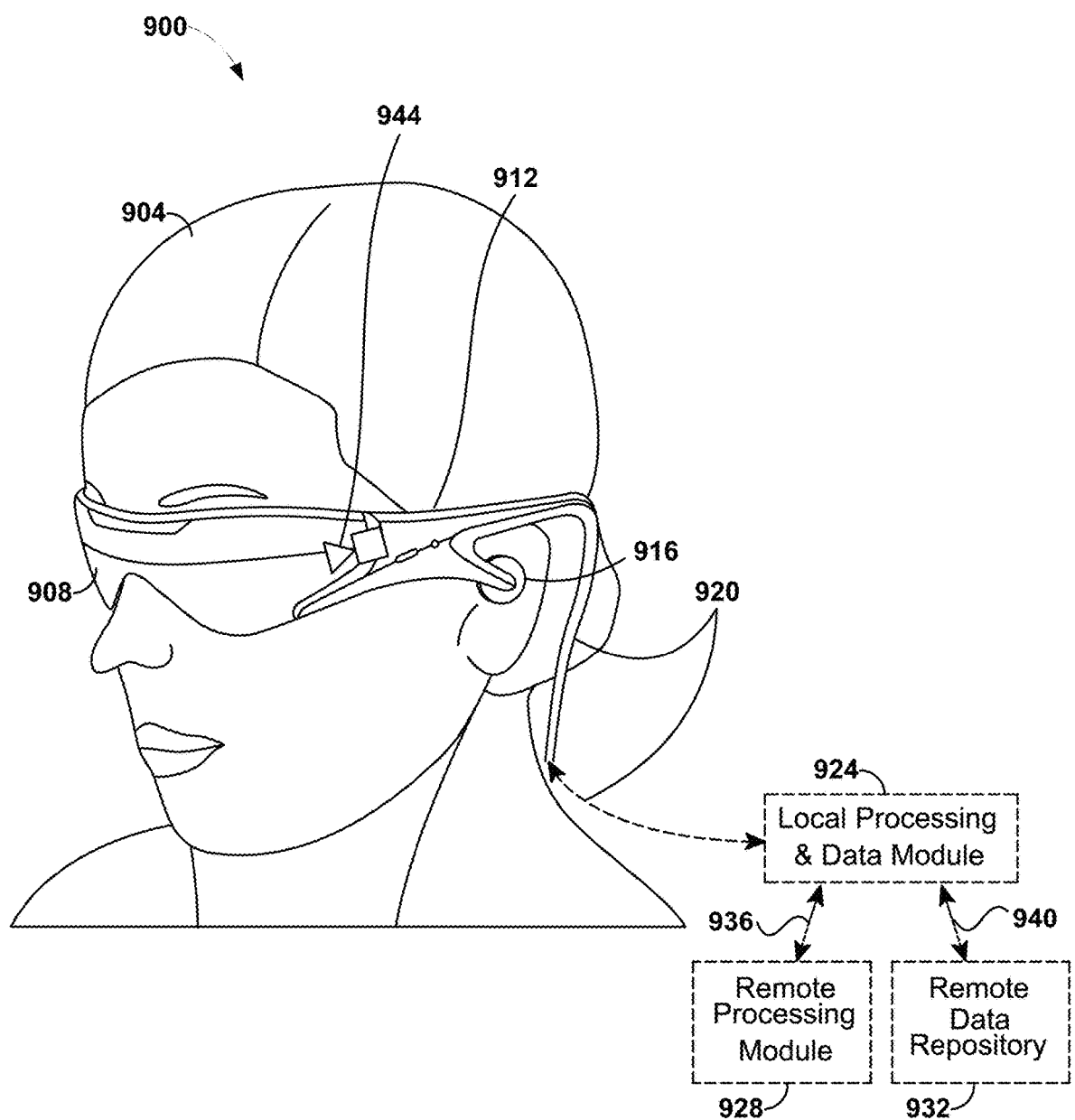
FIG. 9 schematically illustrates an example of a wearable display system, which can implement an embodiment of the multitask network.

FIG. 9 illustrates an example of a wearable display system 900 that can be used to present a VR, AR, or MR experience to a display system wearer or viewer 904. The wearable display system 900 may be programmed to perform any of the applications or embodiments described herein (e.g., executing CNNs, reordering values of input activation maps or kernels, eye image segmentation, or eye tracking). The display system 900 includes a display 908, and various mechanical and electronic modules and systems to support the functioning of that display 908. The display 908 may be coupled to a frame 912, which is wearable by the display system wearer or viewer 904 and which is configured to position the display 908 in front of the eyes of the wearer 904. The display 908 may be a light field display. In some embodiments, a speaker 916 is coupled to the frame 912 and positioned adjacent the ear canal of the user in some embodiments, another speaker, not shown, is positioned adjacent the other ear canal of the user to provide for stereo/shapeable sound control. The display system 900 can include an outward-facing imaging system 944 (e.g., one or more cameras) that can obtain images (e.g., still images or video) of the environment around the wearer 904. Images obtained by the outward-facing imaging system 944 can be analyzed by embodiments of the multitask network trained by the method 800 described with reference to FIG. 8 in the environment around the wearer 904.

The display 908 is operatively coupled 920, such as by a wired lead or wireless connectivity, to a local data processing module 924 which may be mounted in a variety of configurations, such as fixedly attached to the frame 912, fixedly attached to a helmet or hat worn by the user, embedded in headphones, or otherwise removably attached to the user 904 (e.g., in a backpack-style configuration, in a belt-coupling style configuration).

The local processing and data module 924 may comprise a hardware processor, as well as non-transitory digital memory, such as non-volatile memory e.g., flash memory, both of which may be utilized to assist in the processing, caching, and storage of data. The data include data (a) captured from sensors (which may be, e.g., operatively coupled to the frame 912 or otherwise attached to the wearer 904), such as image capture devices (such as cameras), microphones, inertial measurement units, accelerometers, compasses, GPS units, radio devices, and/or gyros; and/or (b) acquired and/or processed using remote processing module 928 and/or remote data repository 932, possibly for passage to the display 908 after such processing or retrieval. The local processing and data module 924 may be operatively coupled to the remote processing module 928 and remote data repository 932 by communication links 936, 940, such as via a wired or wireless communication links, such that these remote modules 928, 932 are operatively coupled to each other and available as resources to the local processing and data module 924. The image capture device (s) can be used to capture the eye images used in the eye image segmentation, or eye tracking procedures.

In some embodiments, the remote processing module 928 may comprise one or more processors configured to analyze and process data and/or image information such as video information captured by an image capture device. The video data may be stored locally in the local processing and data module 924 and/or in the remote data repository 932. In some embodiments, the remote data repository 932 may comprise a digital data storage facility, which may be available through the Internet or other networking configuration in a "cloud" resource configuration. In some embodiments, all data is stored and all computations are performed in the local processing and data module 924, allowing fully autonomous use from a remote module.

In some implementations, the local processing and data module 924 and/or the remote processing module 928 are programmed to perform embodiments of reordering values of input activation maps or kernels, eye image segmentation, or eye tracking disclosed herein. For example, the local processing and data module 924 and/or the remote processing module 928 can be programmed to perform embodiments of task predictions and determinations using a multitask network trained using the method 800 described with reference to FIG. 8. The image capture device can capture video for a particular application (e.g., augmented reality (AR), human-computer interaction (HCI), autonomous vehicles, drones, or robotics in general). The video can be analyzed using a CNN by one or both of the processing modules 924, 928. In some cases, off-loading at least some of the reordering values of input activation maps or kernels, eye image segmentation, or eye tracking to a remote processing module (e.g., in the "cloud") may improve efficiency or speed of the computations. The parameters of the CNN (e.g., weights, bias terms, subsampling factors for pooling layers, number and size of kernels in different layers, number of feature maps, etc.) can be stored in data modules 924 and/or 932.

The results of task predictions or determinations (e.g., the output of the multitask network 800 described with reference to FIG. 8) can be used by one or both of the processing modules 924, 928 for additional operations or processing. For example, the processing modules 924, 928 of the wearable display system 900 can be programmed to perform additional applications (such as applications in augmented reality, human-computer interaction (HCI), autonomous vehicles, drones, or robotics in general) based on the output of the multitask network.

Additional Tasks

Embodiments of GradNorm are not limited to computer vision tasks, where the multitask network is trained on images or visual data. In other embodiments, the training sample can include non-image data captured by sensors, such as audio data, acceleration data, positioning data, temperature data, radio frequency data, or optical tracking data. Examples of sensors include audio sensors (e.g., microphones), inertial measurement units (IMUs), accelerometers, compasses, gyroscopes, temperature sensors, movement sensors, depth sensors, global positioning system (GPS) units, and radio devices. In other embodiments, the training sample for medical-related tasks can include measurements, such as gender, age, heart rate, body temperature, white cell count, disease state, disease progression, symptoms, disease diagnosis, etc.[0101] For example, for tasks relating to speech recognition or natural language processing, the training sample can include audio data sets (or audio data that accompanies a video) or electronic representations or embeddings (e.g., n-grams) of words, sentences, paragraphs, or texts. Tasks can include, for example, part-of-speech (POS) tagging, chunking dependency parsing, semantic relatedness, or textual entailment.

Tasks can be related to medical treatment or medical decision making. For example, tasks can include determination of which laboratory tests should be performed on or a risk assessment for a patient who might have a particular disease. As such an example, training data can include measurements (e.g., gender, age, heart rate, body temperature, white cell count, etc.) of patients with a particular disease or symptom (e.g., pneumonia). Embodiments of GradNorm can be used to train a multitask network for predicting disease risk assessment or laboratory tests for a patient.

Thus the training data used by GradNorm can include images, video, audio, electronic records, databases, etc., which may be associated with a respective training label, classification or signal.

Additional Aspects

In a 1st aspect, a system for training a multitask network is disclosed. The system comprises: non-transitory memory configured to store: executable instructions, and a multitask network for determining outputs associated with a plurality of tasks; and a hardware processor in communication with the non-transitory memory, the hardware processor programmed by the executable instructions to: receive a training image associated with a plurality of reference task outputs for the plurality of tasks; for each task of the plurality of tasks, determine a gradient norm of a single-task loss of (1) a task output for the task determined using the multitask network with the training image as input, and (2) a corresponding reference task output for the task associated with the training image, adjusted by a task weight for the task, with respect to a plurality of network weights of the multitask network; and determine a relative training rate for the task based on the single-task loss for the task; determine a gradient loss function comprising a difference between (1) the determined gradient norm for each task and (2) a corresponding target gradient norm determined based on (a) an average gradient norm of the plurality of tasks, (b) the relative training rate for the task, and (c) a hyperparameter; determine a gradient of the gradient loss function with respect to a task weight for each task of the plurality of tasks; and determine an updated task weight for each of the plurality of tasks using the gradient of the gradient loss function with respect to the task weight.

In a 2nd aspect, the system of aspect 1, wherein the hardware processor is further programmed by the executable instructions to: determine the single-task loss of (1) the task output for each task determined using the multitask network with the training image as input, and (2) the corresponding task output for the task associated with the training image.

In a 3rd aspect, the system of aspect 2, wherein the non-transitory memory is configured to further store: a plurality of loss functions associated with the plurality of tasks.

In a 4th aspect, the system of aspect 3, wherein to determine the single-task loss, the hardware processor is further programmed by the executable instructions to: determine the single-task loss of (1) the task output for each task determined using the multitask network with the training image as input, and (2) the corresponding task output for the task associated with the training image, using a loss function of the plurality of loss functions associated with the task.

In a 5th aspect, the system of any one of aspects 1-4, wherein the hardware processor is further programmed by the executable instructions to: determine a multitask loss function comprising the single-task loss adjusted by the task weight for each task; determine a gradient of the multitask loss function with respect to all network weights of the multitask network; and determine updated network weights of the multitask network based on the gradient of the multitask loss function.

In a 6th aspect, the system of any one of aspects 1-5, wherein the gradient norm of the single-task loss adjusted by the task weight is a L2 norm of the single-task loss adjusted by the task weight.

In a 7th aspect, the system of any one of aspects 1-6, wherein the gradient loss function is a L1 loss function.

In a 8th aspect, the system of any one of aspects 1-7, wherein the hardware processor is further programmed by the executable instructions to: determine an average of the gradient norms of the plurality of tasks as the average gradient norm.

In a 9th aspect, the system of any one of aspects 1-8, wherein the corresponding target gradient norm is determined based on (a) an average gradient norm of the plurality of tasks, (b) an inverse of the relative training rate for the task, and (c) a hyperparameter In a 10th aspect, the system of aspect 9, wherein the hardware processor is further programmed by the executable instructions to: determine the average gradient norm of the plurality of tasks multiplied by the inverse relative training rate for the task to the power of the hyperparameter as the corresponding target gradient norm.

In a 11th aspect, the system of any one of aspects 9-10, wherein to determine the relative training rate for the task based on the single-task loss for the task, the hardware processor is further programmed by the executable instructions to: determine the inverse of the relative training rate for the task based on a loss ratio of the single-task loss for the task and another single-task loss for the task.

In a 12th aspect, the system of aspect 11, wherein to determine the inverse of the relative rate for the task, the hardware processor is further programmed by the executable instructions to: determine a ratio of the loss ratio of the task and an average of loss ratios of the plurality of tasks as the inverse of the relative training rate.

In a 13th aspect, the system of any one of aspects 1-12, wherein to determine the gradient of the gradient loss function, the hardware processor is further programmed by the executable instructions to: determine the gradient of the gradient loss function with respect to the task weight for each task of the plurality of tasks while keeping the target gradient norm for the task constant.

In a 14th aspect, the system of any one of aspects 1-13, wherein the hardware processor is further programmed by the executable instructions to: normalize the updated weights for the plurality of tasks.

In a 15th aspect, the system of aspect 14, wherein to normalize the updated weights for the plurality of tasks, the hardware processor is further programmed by the executable instructions to: normalize the updated weights for the plurality of tasks to a number of the plurality of tasks.

In a 16th aspect, the system of any one of aspects 1-15, wherein the plurality of tasks comprises a regression task, a classification task, or a combination thereof.

In a 17th aspect, the system of aspect 16, wherein the classification task comprises perception, face recognition, visual search, gesture recognition, semantic segmentation, object detection, room layout estimation, cuboid detection, lighting detection, simultaneous localization and mapping, relocalization, speech processing, speech recognition, natural language processing, or a combination thereof.

In a 18th aspect, the system of any one of aspects 1-17, wherein the multitask network comprises a plurality of shared layers and an output layer comprising a plurality of task specific filters.

In a 19th aspect, the system of aspect 18, wherein the output layer of the multitask network comprises an affine transformation layer.

In a 20th aspect, a method for training a multitask network is disclosed. The method is under control of a hardware processor and comprises: receiving a training datum of a plurality of training data each associated with a plurality of reference task outputs for the plurality of tasks; for each task of the plurality of tasks, determining a gradient norm of a single-task loss adjusted by a task weight for the task, with respect to a plurality of network weights of the multitask network, the single-task loss being of (1) a task output for the task determined using a multitask network with the training datum as input, and (2) a corresponding reference task output for the task associated with the training datum; and determining a relative training rate for the task based on the single-task loss for the task; determining a gradient loss function comprising a difference between (1) the determined gradient norm for each task and (2) a corresponding target gradient norm determined based on (a) an average gradient norm of the plurality of tasks, and (b) the relative training rate for the task; and determining an updated task weight for each of the plurality of tasks using a gradient of a gradient loss function with respect to the task weight.

In a 21st aspect, the method of aspect 20, wherein the plurality of training data comprises a plurality of training images, and wherein the plurality of tasks comprises computer vision tasks, speech recognition tasks, natural language processing tasks, medical diagnostic tasks, or a combination thereof.

In a 22nd aspect, the method of any one of aspects 20-21, further comprising: determining the single-task loss of (1) the task output for each task determined using the multitask network with the training image as input, and (2) the corresponding task output for the task associated with the training image.

In a 23rd aspect, the method of aspect 22, wherein determining the single-task loss comprises: determining the single-task loss of (1) the task output for each task determined using the multitask network with the training image as input, and (2) the corresponding task output for the task associated with the training image, using a loss function of the plurality of loss functions associated with the task.

In a 24th aspect, the method of any one of aspects 20-23, further comprising: determining a multitask loss function comprising the single-task loss adjusted by the task weight for each task; determining a gradient of the multitask loss function with respect to all network weights of the multitask network; and determining updated network weights of the multitask network based on the gradient of the multitask loss function.

In a 25th aspect, the method of any one of aspects 20-24, wherein the gradient norm of the single-task loss adjusted by the task weight is a L2 norm of the single-task loss adjusted by the task weight.

In a 26th aspect, the method of any one of aspects 20-25, wherein the gradient loss function is a L1 loss function.

In a 27th aspect, the method of any one of aspects 20-26, further comprising: determining an average of the gradient norms of the plurality of tasks as the average gradient norm.

In a 28th aspect, the method of any one of aspects 20-27, further comprising: determining the corresponding target gradient norm based on (a) an average gradient norm of the plurality of tasks, (b) the relative training rate for the task, and (c) a hyperparameter.

In a 29th aspect, the method of any one of aspects 20-27, further comprising: determining the corresponding target gradient norm based on (a) an average gradient norm of the plurality of tasks, (b) an inverse of the relative training rate for the task, and (c) a hyperparameter In a 30th aspect, the method of aspect 29, further comprising: determining the average gradient norm of the plurality of tasks multiplied by the inverse relative training rate for the task to the power of the hyperparameter as the corresponding target gradient norm.

In a 31st aspect, the method of any one of aspects 29-30, wherein determining the relative training rate for the task based on the single-task loss for the task comprises: determining the inverse of the relative training rate for the task based on a loss ratio of the single-task loss for the task and another single-task loss for the task.

In a 32nd aspect, the method of aspect 31, wherein determining the inverse of the relative rate for the task comprises: determining a ratio of the loss ratio of the task and an average of loss ratios of the plurality of tasks as the inverse of the relative training rate.

In a 33rd aspect, the method of any one of aspects 20-32, further comprising: determining the gradient of the gradient loss function with respect to a task weight for each task of the plurality of tasks.

In a 34th aspect, the method of aspect 33, wherein determining the gradient of the gradient loss function comprises: determining the gradient of the gradient loss function with respect to the task weight for each task of the plurality of tasks while keeping the target gradient norm for the task constant.

In a 35th aspect, the method of any one of aspects 20-34, further comprising: normalizing the updated weights for the plurality of tasks.

In a 36th aspect, the method of aspect 35, wherein normalizing the updated weights for the plurality of tasks comprises: normalizing the updated weights for the plurality of tasks to a number of the plurality of tasks.

In a 37th aspect, the method of any one of aspects 20-36, wherein the plurality of tasks comprises a regression task, a classification task, or a combination thereof.

In a 38th aspect, the method of aspect 37, wherein the classification task comprises perception, face recognition, visual search, gesture recognition, semantic segmentation, object detection, room layout estimation, cuboid detection, lighting detection, simultaneous localization and mapping, relocalization, speech processing, speech recognition, natural language processing, or a combination thereof.

In a 39th aspect, the method of any one of aspects 20-38, wherein the multitask network comprises a plurality of shared layers and an output layer comprising a plurality of task specific filters.

In a 40th aspect, the method of aspect 39, wherein the output layer of the multitask network comprises an affine transformation layer.

In a 41st aspect, a head mounted display system is disclosed. The system comprises: non-transitory memory configured to store: executable instructions, and a multitask network of any one of aspects 1-40; a display; a sensor; and a hardware processor in communication with the non-transitory memory and the display, the hardware processor programmed by the executable instructions to: receive a sensor datum captured by the sensor; determine a task output for each task of the plurality of tasks using the multitask network with the sensor datum as input; and cause the display to show information related to the determined task outputs to a user of the augmented reality device.

In a 42nd aspect, a head mounted display system is disclosed. The system comprises: non-transitory memory configured to store: executable instructions, and a multitask network for determining outputs associated with a plurality of tasks, wherein the multitask network is trained using: a gradient norm of a single-task loss, of (1) a task output for a task of the plurality of tasks determined using the multitask network with a training datum as input, and (2) a corresponding reference task output for the task associated with the training datum, adjusted by a task weight for the task, with respect to a plurality of network weights of the multitask network, a relative training rate for the task determined based on the single-task loss for the task, a gradient loss function comprising a difference between (1) the determined gradient norm for the task and (2) a corresponding target gradient norm determined based on (a) an average gradient norm of the plurality of tasks, (b) the relative training rate for the task, and (c) a hyperparameter, an updated task weight for the task using a gradient of the gradient loss function with respect to the task weight for the task; a display; a sensor; and a hardware processor in communication with the non-transitory memory and the display, the hardware processor programmed by the executable instructions to: receive a sensor input captured by the sensor; determine a task output for each task of the plurality of tasks using the multitask network; and cause the display to show information related to the determined task outputs to a user of the augmented reality device.

In a 43rd aspect, the system of aspect 42, wherein the sensor comprises an inertial measurement unit, an outward-facing camera, a depth sensing camera, a microphone, an eye imaging camera, or a combination thereof.

In a 44th aspect, the system of any one of aspects 42-43, wherein the plurality of tasks comprises one or more perceptual tasks, one or more regression tasks, one or more classification tasks, speech recognition tasks, natural language processing tasks, medical diagnostic tasks, or a combination thereof In a 45th aspect, the system of aspect 44, wherein the perceptual tasks comprises the face recognition, visual search, gesture identification, semantic segmentation, object detection, lighting detection, simultaneous localization and mapping, relocalization, or a combination thereof.

In a 46th aspect, the system of any one of aspects 44-45, wherein the classification tasks comprise perception, face recognition, visual search, gesture recognition, semantic segmentation, object detection, room layout estimation, cuboid detection, lighting detection, simultaneous localization and mapping, relocalization, speech processing, speech recognition, natural language processing, or a combination thereof.

In a 47th aspect, the system of any one of aspects 42-46, wherein the multitask network is trained by: receiving a training datum of a plurality of training data each associated with a plurality of reference task outputs for the plurality of tasks; for each task of the plurality of tasks, determining a gradient norm of a single-task loss adjusted by a task weight for the task, with respect to a plurality of network weights of the multitask network, the single-task loss being of (1) a task output for the task determined using a multitask network with the training datum as input, and (2) a corresponding reference task output for the task associated with the training datum; and determining a relative training rate for the task based on the single-task loss for the task; determining a gradient loss function comprising a difference between (1) the determined gradient norm for each task and (2) a corresponding target gradient norm determined based on (a) an average gradient norm of the plurality of tasks, and (b) the relative training rate for the task; and determining an updated task weight for each of the plurality of tasks using a gradient of a gradient loss function with respect to the task weight.

In a 48th aspect, the system of aspect 47, wherein the plurality of training data comprises a plurality of training images, and wherein the plurality of tasks comprises computer vision tasks.

In a 49th aspect, the system of any one of aspects 47-48, wherein the multitask network is trained by: determining the single-task loss of (1) the task output for each task determined using the multitask network with the training image as input, and (2) the corresponding task output for the task associated with the training image.

In a 50th aspect, the system of aspect 49, wherein determining the single-task loss comprises: determining the single-task loss of (1) the task output for each task determined using the multitask network with the training image as input, and (2) the corresponding task output for the task associated with the training image, using a loss function of the plurality of loss functions associated with the task.

In a 51st aspect, the system of any one of aspects 47-50, wherein the multitask network is trained by: determining a multitask loss function comprising the single-task loss adjusted by the task weight for each task; determining a gradient of the multitask loss function with respect to all network weights of the multitask network; and determining updated network weights of the multitask network based on the gradient of the multitask loss function.

In a 52nd aspect, the system of any one of aspects 47-51, wherein the gradient norm of the single-task loss adjusted by the task weight is a L2 norm of the single-task loss adjusted by the task weight.

In a 53rd aspect, the system of any one of aspects 47-52, wherein the gradient loss function is a L1 loss function.

In a 54th aspect, the system of any one of aspects 47-53, wherein the multitask network is trained by: determining an average of the gradient norms of the plurality of tasks as the average gradient norm.

In a 55th aspect, the system of any one of aspects 47-54, wherein the multitask network is trained by: determining the corresponding target gradient norm based on (a) an average gradient norm of the plurality of tasks, (b) the relative training rate for the task, and (c) a hyperparameter.

In a 56th aspect, the system of any one of aspects 47-54, wherein the multitask network is trained by: determining the corresponding target gradient norm based on (a) an average gradient norm of the plurality of tasks, (b) an inverse of the relative training rate for the task, and (c) a hyperparameter In a 57th aspect, the system of aspect 56, wherein the multitask network is trained by: determining the average gradient norm of the plurality of tasks multiplied by the inverse relative training rate for the task to the power of the hyperparameter as the corresponding target gradient norm.

In a 58th aspect, the system of any one of aspects 56-57, wherein determining the relative training rate for the task based on the single-task loss for the task comprises: determining the inverse of the relative training rate for the task based on a loss ratio of the single-task loss for the task and another single-task loss for the task.

In a 59th aspect, the system of aspect 58, wherein determining the inverse of the relative rate for the task comprises: determining a ratio of the loss ratio of the task and an average of loss ratios of the plurality of tasks as the inverse of the relative training rate.

In a 60th aspect, the system of any one of aspects 47-59, wherein the multitask network is trained by: determining the gradient of the gradient loss function with respect to a task weight for each task of the plurality of tasks.

In a 61st aspect, the system of aspect 60, wherein determining the gradient of the gradient loss function comprises: determining the gradient of the gradient loss function with respect to the task weight for each task of the plurality of tasks while keeping the target gradient norm for the task constant.

In a 62nd aspect, the system of any one of aspects 47-61, wherein the multitask network is trained by: normalizing the updated weights for the plurality of tasks.

In a 63rd aspect, the system of aspect 62, wherein normalizing the updated weights for the plurality of tasks comprises: normalizing the updated weights for the plurality of tasks to a number of the plurality of tasks.

In a 64th aspect, the system of any one of aspects 47-63, wherein the multitask network comprises a plurality of shared layers and an output layer comprising a plurality of task specific filters.

In a 65th aspect, the system of aspect 64, wherein the output layer of the multitask network comprises an affine transformation layer.

In a 66th aspect, a method for training a multitask neural network for determining outputs associated with a plurality of tasks is disclosed. The method is under control of a hardware processor and comprises: receiving a training sample set associated with a plurality of reference task outputs for the plurality of tasks; calculating a multitask loss function based at least partly on a weighted combination of single task loss functions, wherein weights in the weighted multitask loss function can vary at each training step; determining, during the training, the weights for each of the single task loss functions such that each task of the plurality of tasks is trained at a similar rate; and outputting a trained multitask neural network based at least in part on the training.

In a 67th aspect, the method of aspect 66, wherein the tasks comprise computer vision tasks, speech recognition tasks, natural language processing tasks, or medical diagnostic tasks.

In a 68th aspect, the method of any one of aspects 66-67, wherein the multitask loss function is a linear combination of the weights and the single task loss functions.

In a 69th aspect, the method of any one of aspects 66-68, wherein determining the weights for each of the single task loss functions comprises penalizing the multitask neural network when backpropagated gradients from a first task of the plurality of tasks are substantially different from backpropagated gradients from a second task of the plurality of tasks.

In a 70th aspect, the method of any one of aspects 66-69, wherein determining the weights for each of the single task loss functions comprises decreasing a first weight for a first task of the plurality of tasks relative to a second weight for a second task of the plurality of tasks when a first training rate for the first task exceeds a second training rate for the second task.

In a 71st aspect, the method of any one of aspects 66-70, wherein determining the weights for each of the single task loss functions comprises: evaluating a gradient norm of a weighted single-task loss function for each task of the plurality of tasks with respect to the weights at a training time; evaluating an average gradient norm across all tasks at the training time; calculating a relative inverse training rate for each task of the plurality of tasks; and calculating a gradient loss function based at least partly on differences between the gradient norms of each of the weighted single-task loss functions and the average gradient norm multiplied by a function of the relative inverse training rate.

In a 72nd aspect, the method of aspect 71, wherein the gradient loss function comprises an L-1 loss function.

In a 73rd aspect, the method of any one of aspects 71-72, wherein the function of the relative inverse training rate comprises a power law function.

In a 74th aspect, the method of aspect 73, wherein the power law function has a power law exponent in a range from −1 to 3.

In a 75th aspect, the method of aspect 73, wherein the power law function has a power law exponent that varies during the training.

Additional Considerations

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time. As another example, training a deep multitask network using embodiments of the GradNorm methods described herein are computationally challenging and can be implemented on graphical processing units (GPUs), application specific integrated circuits (ASICs), or floating point gate arrays (FPGAs).

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described herein may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A system for training a multitask network comprising:
   non-transitory memory configured to store:
   executable instructions, and
   a multitask network for determining outputs associated with a plurality of tasks; and
   a hardware processor in communication with the non-transitory memory, the hardware processor programmed by the executable instructions to:
   receive a training image associated with a plurality of reference task outputs for the plurality of tasks;
   for each task of the plurality of tasks and during a training,
   determine a gradient norm of a single-task loss of (1) a task output for the task determined using the multitask network with the training image as input, and (2) a corresponding reference task output for the task associated with the training image, adjusted by a task weight for the task, with respect to a plurality of network weights of the multitask network; and
   determine a relative training rate for the task based on the single-task loss for the task so each of the plurality of tasks are trained at a similar training rate, wherein the relative training rate for the task is associated with the task weight that is configured at each iteration such that each iteration in the plurality of tasks completes its training over a similar length of training time;
   determine a gradient loss function comprising a difference between (1) the determined gradient norm for each task and (2) a corresponding target gradient norm determined based on (a) an average gradient norm of the plurality of tasks, (b) the relative training rate for the task, and (c) a hyperparameter;
   determine a gradient of the gradient loss function with respect to a task weight for each task of the plurality of tasks; and
   determine an updated task weight for each of the plurality of tasks using the gradient of the gradient loss function with respect to the task weight, wherein the updated task weights are an improvement over the task weights such that the updated task weights result in each iteration in the plurality of tasks completing over a more similar length of training time as compared to using the task weights.

2. The system of claim 1, wherein the hardware processor is further programmed by the executable instructions to: determine the single-task loss of (1) the task output for each task determined using the multitask network with the training image as input, and (2) the corresponding task output for the task associated with the training image.

3. The system of claim 2, wherein the non-transitory memory is configured to further store: a plurality of loss functions associated with the plurality of tasks.

4. The system of claim 3, wherein to determine the single-task loss, the hardware processor is further programmed by the executable instructions to: determine the single-task loss of (I) the task output for each task determined using the multitask network with the training image as input, and (2) the corresponding task output for the task associated with the training image, using a loss function of the plurality of loss functions associated with the task.

5. The system of claim 1, wherein the hardware processor is further programmed by the executable instructions to:
   determine a multitask loss function comprising the single-task loss adjusted by the task weight for each task;
   determine a gradient of the multitask loss function with respect to all network weights of the multitask network; and
   determine updated network weights of the multitask network based on the gradient of the multitask loss function.

6. The system of claim 1, wherein the gradient norm of the single-task loss adjusted by the task weight is a L2 norm of the single-task loss adjusted by the task weight.

7. The system of claim 1, wherein the gradient loss function is a L1 loss function.

8. The system of claim 1, wherein the hardware processor is further programmed by the executable instructions to: determine an average of the gradient norms of the plurality of tasks as the average gradient norm.

9. The system of claim 1, wherein the corresponding target gradient norm is determined based on (a) an average gradient norm of the plurality of tasks, (b) an inverse of the relative training rate for the task, and (c) a hyperparameter.

10. The system of claim 9, wherein the hardware processor is further programmed by the executable instructions to: determine the average gradient norm of the plurality of tasks multiplied by the inverse relative training rate for the task to a power corresponding to the hyperparameter as the corresponding target gradient norm.

11. The system of claim 9, wherein to determine the relative training rate for the task based on the single-task loss for the task, the hardware processor is further programmed by the executable instructions to: determine the inverse of the relative training rate for the task based on a loss ratio of the single-task loss for the task and another single-task loss for the task.

12. The system of claim 11, wherein to determine the inverse of the relative rate for the task, the hardware processor is further programmed by the executable instructions to: determine a ratio of the loss ratio of the task and an average of loss ratios of the plurality of tasks as the inverse of the relative training rate.

13. The system of claim 1, wherein to determine the gradient of the gradient loss function, the hardware processor is further programmed by the executable instructions to: determine the gradient of the gradient loss function with respect to the task weight for each task of the plurality of tasks while keeping the target gradient norm for the task constant.

14. The system of claim 1, wherein the hardware processor is further programmed by the executable instructions to: normalize the updated weights for the plurality of tasks.

15. The system of claim 14, wherein to normalize the updated weights for the plurality of tasks, the hardware processor is further programmed by the executable instructions to: normalize the updated weights for the plurality of tasks to a number of the plurality of tasks.

16. The system of claim 1, wherein the plurality of tasks comprises a regression task, a classification task, or a combination thereof.

17. The system of claim 16, wherein the classification task comprises perception, face recognition, visual search, gesture recognition, semantic segmentation, object detection, room layout estimation, cuboid detection, lighting detection, simultaneous localization and mapping, relocalization, speech processing, speech recognition, natural language processing, or a combination thereof.

18. The system of claim 1, wherein the multitask network comprises a plurality of shared layers and an output layer comprising a plurality of task specific filters.

19. The system of claim 18, wherein the output layer of the multitask network comprises an affine transformation layer.

20. A method for training a multitask network comprising:
under control of a hardware processor:
receiving a training datum of a plurality of training data each associated with a plurality of reference task outputs for the plurality of tasks;
for each task of the plurality of tasks during a training,
determining a gradient norm of a single-task loss adjusted by a task weight for the task, with respect to a plurality of network weights of the multitask network, the single-task loss being of (1) a task output for the task determined using a multitask network with the training datum as input, and (2) a corresponding reference task output for the task associated with the training datum; and
determining a relative training rate for the task based on the single-task loss for the task;
wherein the relative training rates for the plurality of task are determined so that each iteration in the plurality of tasks completes over a similar length of training time;
determining a gradient loss function comprising a difference between (1) the determined gradient norm for each task and (2) a corresponding target gradient norm determined based on (a) an average gradient norm of the plurality of tasks, and (b) the relative training rate for the task; and
determining an updated task weight for each of the plurality of tasks using a gradient of a gradient loss function with respect to the task weight.

21. The method of claim 20, wherein the corresponding target gradient norm is determined based on (a) an average gradient norm of the plurality of tasks, (b) the relative training rate for the task, and (c) a hyperparameter.

22. The method of claim 20, further comprising: determining the gradient of the gradient loss function with respect to a task weight for each task of the plurality of tasks.

23. The method of claim 20, wherein the plurality of training data comprises a plurality of training images, and wherein the plurality of tasks comprises computer vision tasks.

24. A head mounted display system comprising:
non-transitory memory configured to store:
executable instructions, and
a multitask network;
a display;
a sensor; and
a hardware processor in communication with the non-transitory memory and the display, the hardware processor programmed by the executable instructions to:
determine, using the multitask network, outputs associated with a plurality of tasks, wherein for each task of the plurality of tasks the multitask network is trained by:
determining a gradient norm of a single-task loss, of (1) a task output for a task of the plurality of tasks determined using the multitask network with a training image as input, and (2) a corresponding reference task output for the task associated with the training image, adjusted by a task weight for the task, with respect to a plurality of network weights of the multitask network,
determining a relative training rate for the task determined based on the single-task loss for the task,
determining a gradient loss function comprising a difference between (1) the determined gradient norm for the task and (2) a corresponding target gradient norm determined based on (a) an average gradient norm of the plurality of tasks, (b) the relative training rate for the task, and (c) a hyperparameter, and
determining an updated task weight for the task using a gradient of the gradient loss function with respect to the task weight for the task such that the updated task weight for the task is based at least in part on the relative training rate for the task;
wherein the relative training rates for the plurality of tasks are determined so that each iteration in the plurality of tasks completes over a similar length of training time;
receive a sensor datum captured by the sensor;
determine a task output for each task of the plurality of tasks using the multitask network with the sensor datum as input; and
cause the display to show information related to the determined task outputs to a user of the head mounted display system.

25. The system of claim 24, wherein the plurality of tasks comprises a plurality of perceptual tasks.

26. The system of claim 25, wherein the plurality of perceptual tasks comprises the face recognition, visual search, gesture identification, semantic segmentation, object detection, lighting detection, simultaneous localization and mapping, relocalization, or a combination thereof.

27. The system of claim 24, wherein the sensor comprises an inertial measurement unit, an outward-facing camera, a depth sensing camera, a microphone, an eye imaging camera, or a combination thereof.

* * * * *